(12) United States Patent
Hwang et al.

(10) Patent No.: US 11,500,239 B2
(45) Date of Patent: Nov. 15, 2022

(54) DISPLAY DEVICE

(71) Applicant: Samsung Display Co., Ltd., Yongin-Si (KR)

(72) Inventors: Tae Hyung Hwang, Seoul (KR); Dong Il Son, Seoul (KR)

(73) Assignee: Samsung Display Co., Ltd.

( * ) Notice: Subject to any disclaimer, the term of this patent is extended or adjusted under 35 U.S.C. 154(b) by 131 days.

(21) Appl. No.: 16/507,355

(22) Filed: Jul. 10, 2019

(65) Prior Publication Data

US 2020/0117046 A1    Apr. 16, 2020

(30) Foreign Application Priority Data

Oct. 10, 2018  (KR) .................. 10-2018-0120723

(51) Int. Cl.
| | | |
|---|---|---|
| G02F 1/1335 | (2006.01) | |
| G02F 1/13357 | (2006.01) | |
| G02B 5/30 | (2006.01) | |
| G02F 1/1333 | (2006.01) | |

(52) U.S. Cl.
CPC ..... *G02F 1/133514* (2013.01); *G02B 5/3025* (2013.01); *G02F 1/13362* (2013.01); *G02F 1/133504* (2013.01); *G02F 1/133524* (2013.01); *G02F 1/133548* (2021.01); *G02F 1/133565* (2021.01); *G02F 1/133602* (2013.01); *G02F 1/133357* (2021.01); *G02F 1/133607* (2021.01)

(58) Field of Classification Search
None
See application file for complete search history.

(56) References Cited

U.S. PATENT DOCUMENTS

| | | | | |
|---|---|---|---|---|
| 2007/0132921 A1* | 6/2007 | Yoon | ...................... | B82Y 20/00 |
| | | | | 438/149 |
| 2009/0322677 A1* | 12/2009 | Lee | ........................ | G06F 3/0421 |
| | | | | 252/301.16 |
| 2016/0195773 A1* | 7/2016 | Lee | ................... | G02F 1/133617 |
| | | | | 349/110 |
| 2017/0329175 A1* | 11/2017 | Lee | ................... | G02F 1/133512 |
| 2018/0202616 A1* | 7/2018 | Yoon | ........................ | H01L 33/50 |
| 2018/0292711 A1* | 10/2018 | Yoon | ................. | G02F 1/133514 |
| 2018/0341147 A1* | 11/2018 | Sugitani | ............ | G02F 1/133617 |
| 2018/0364521 A1* | 12/2018 | Baek | ................. | G02F 1/133528 |
| 2020/0142247 A1* | 5/2020 | Zhao | ................. | G02F 1/133512 |

FOREIGN PATENT DOCUMENTS

| | | |
|---|---|---|
| KR | 10-2008-0004880 A | 1/2008 |
| KR | 2013-228760 A | 11/2013 |
| KR | 10-2017-0014755 A | 2/2017 |
| KR | 10-2018-0136614 A | 12/2018 |

* cited by examiner

*Primary Examiner* — Phu Vu
(74) *Attorney, Agent, or Firm* — Innovation Counsel LLP

(57) ABSTRACT

A display device is provided. The display device comprises a first substrate, a second substrate facing the first substrate, a first polarizing layer disposed between the first substrate and the second substrate and including first line grid patterns, a light scattering layer disposed between the first polarizing layer and the second substrate, and color filter layers disposed between the light scattering layer and the second substrate.

29 Claims, 18 Drawing Sheets

DISPLAY DEVICE

This application claims priority to Korean Patent Application No. 10-2018-0120723, filed on Oct. 10, 2018, and all the benefits accruing therefrom under 35 U.S.C. § 119, the disclosure of which is incorporated herein by reference in its entirety.

BACKGROUND

1. Field

The present disclosure relates to a display device, and more particularly, to a liquid crystal display (LCD) device.

2. Description of the Related Art

Display devices have increasingly become important with the development of multimedia. Accordingly, various display devices such as a liquid crystal display device (LCD), an organic light-emitting diode (OLED) display device, and the like have been developed.

For example, an LCD device includes an LCD panel and a light source providing light to the LCD panel, and the LCD panel includes field generating electrodes, such as pixel electrodes and a common electrode, and a liquid crystal layer in which an electric field is formed by the field generating electrodes. The LCD device displays an image by rearranging liquid crystal molecules in the liquid crystal layer using the field generating electrodes and controlling the amount of light passing through the liquid crystal layer on a pixel-by-pixel basis.

SUMMARY

Embodiments of the present disclosure provide a liquid crystal display (LCD) device with improved side visibility.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to an embodiment of the present disclosure, a display device comprises a first substrate, a second substrate facing the first substrate, a first polarizing layer disposed between the first substrate and the second substrate and including first line grid patterns, a light scattering layer disposed between the first polarizing layer and the second substrate, and color filter layers disposed between the light scattering layer and the second substrate.

According to another embodiment of the present disclosure, a display device comprises a first substrate, a second substrate facing the first substrate, a first polarizing layer disposed between the first substrate and the second substrate and including first line grid patterns, a light scattering layer disposed between the first polarizing layer and the second substrate, and color filter layers disposed between the light scattering layer and the first polarizing layer.

According to another embodiment of the present disclosure, a display device comprises a first substrate, a second substrate facing the first substrate, a first polarizing layer disposed between the first substrate and the second substrate and including first line grid patterns, and color filter layers disposed between the first polarizing layer and the second substrate, wherein the color filter layers include light scatterers.

According to the aforementioned and other embodiments of the present disclosure, an LCD device with improved side visibility can be provided.

Other features and embodiments may be apparent from the following detailed description, the drawings, and the claims.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Figure 1:
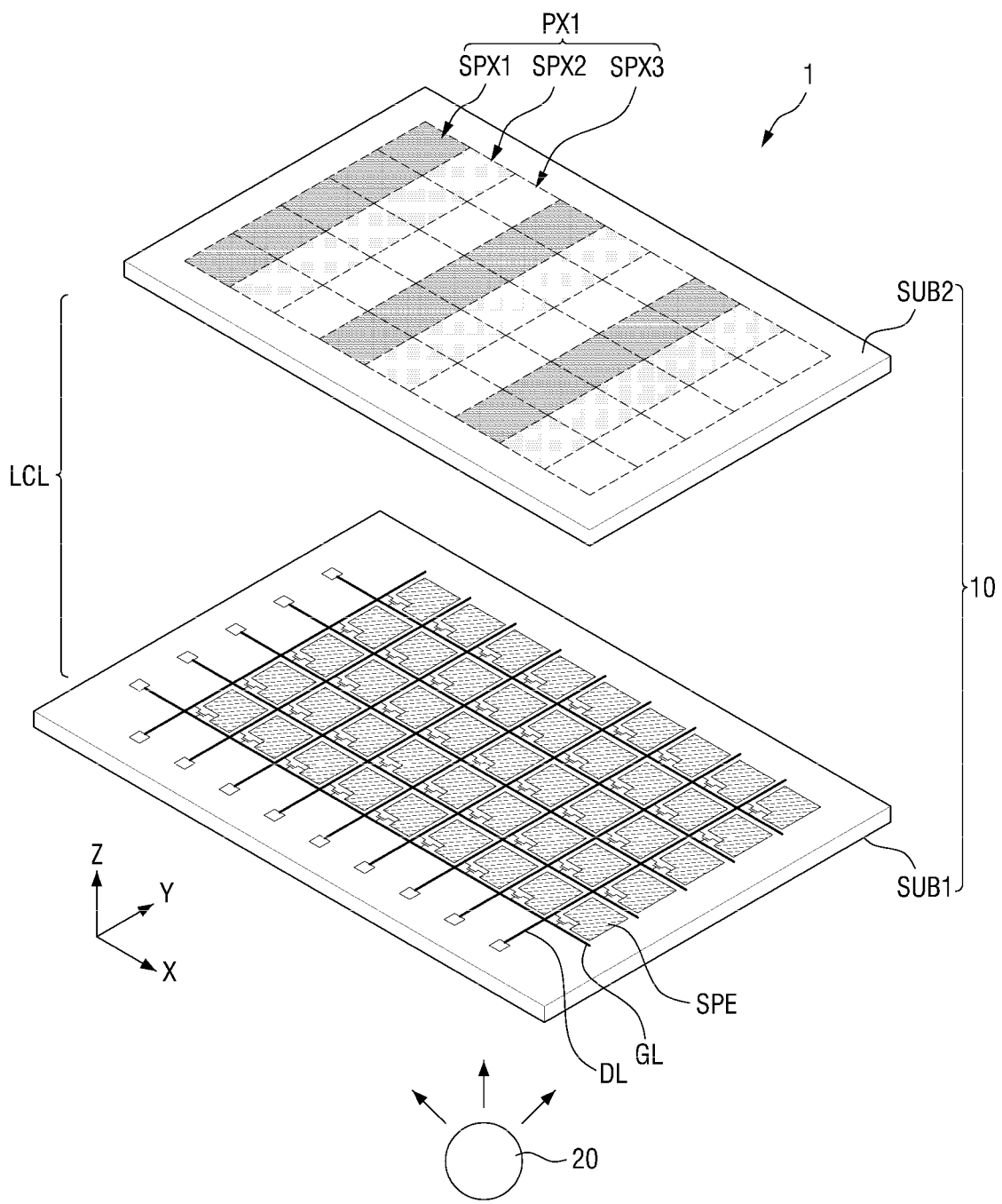
FIG. 1 is an exploded perspective view of a display device according to an embodiment of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

In the drawings, components may be exaggerated or reduced in size for convenience of explanation.

Throughout the specification, like reference numerals refer to like elements.

Hereinafter, exemplary embodiments of the present inventive concept will be described in detail with reference to the accompanying drawings.

Figure 2:
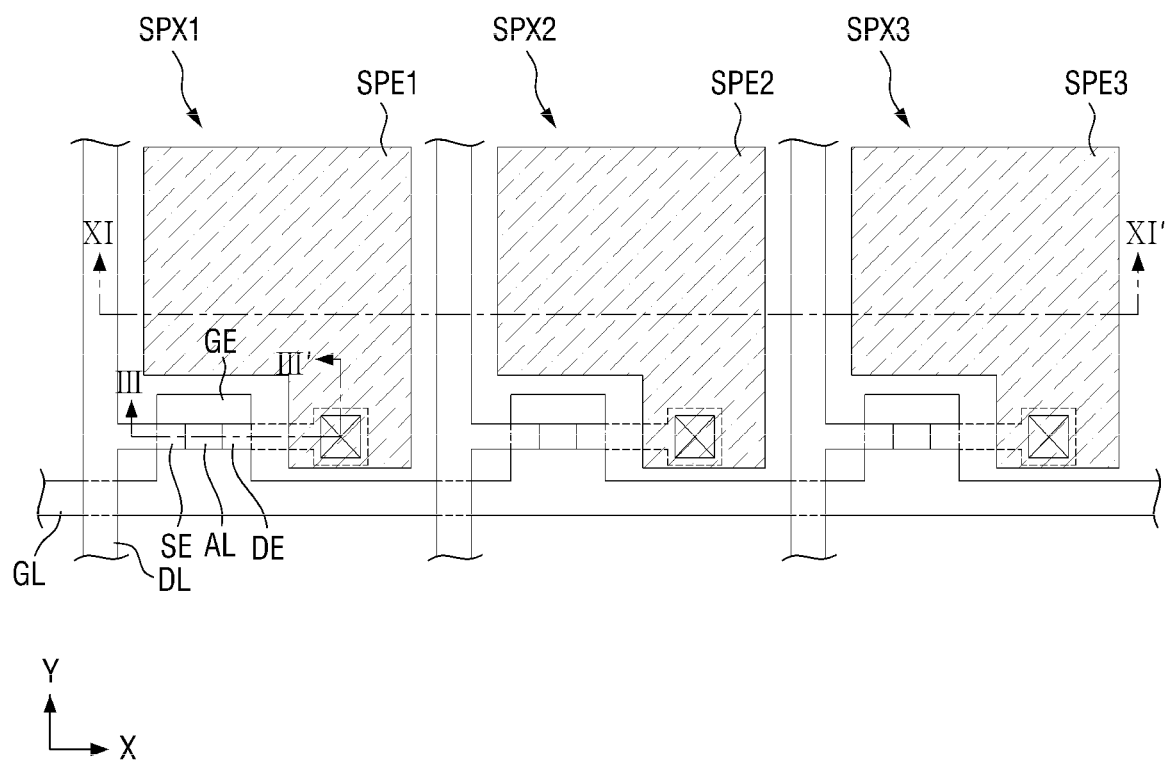
FIG. 2 is a layout view of an arbitrary pixel of the display device of FIG. 1.

FIG. 1 is an exploded perspective view of a display device according to an embodiment of the present disclosure. FIG. 2 is a layout view of an arbitrary pixel of the display device of FIG. 1.

Referring to FIGS. 1 and 2, a display device 1 includes a display panel 10 and a backlight unit 20 providing light to the display panel 10.

The display panel 10 may include a lower display panel SUB1, an upper display panel SUB2 facing the lower display panel SUB1, and a liquid crystal layer LCL interposed between the lower and upper display panels SUB1 and SUB2. The liquid crystal layer LCL may be in the state of being sealed by the lower and upper display panels SUB1 and SUB2 and a sealing member (not illustrated) bonding the lower and upper display panels SUB1 and SUB2 together.

In a plan view, a plurality of pixels including a first pixel PX1 may be defined on the display panel 10. Each of the plurality of pixels may include multiple subpixels, and each of the multiple subpixels may display a predetermined color. The term "pixel", as used herein, refers to a single region defined by partitioning a display area in a plan view, and each of the plurality of pixels may display a single color obtained by combining the colors displayed by multiple subpixels thereof. That is, the plurality of pixels may be the minimal units of the display panel 10 for displaying colors independently. The plurality of pixels will hereinafter be described, taking the first pixel PX1 as an example.

The subpixels of the first pixel PX1 may include a first subpixel SPX1 displaying a first color, a second subpixel SPX2 displaying a second color, which has a shorter central wavelength than the first color, and a third subpixel SPX3 displaying a third color, which has a shorter central wavelength than the second color.

For example, the first subpixel SPX1 may be a red subpixel displaying a red color, the second subpixel SPX2 may be a green subpixel adjacent to the first subpixel SPX1 in a first direction X and displaying a green color, and the third subpixel SPX3 may be a blue subpixel adjacent to the second subpixel SPX2 in the first direction X and displaying a blue color.

The display panel 10 may include a plurality of gate lines GL extending in the first direction X and a plurality of data lines DL extending in a second direction Y and insulated from the gate lines GL. The gate lines GL and the data lines DL may be connected to drivers (not illustrated) and may thus transmit driving signals to subpixel electrodes SPE disposed in the subpixels of each of the plurality of pixels.

The backlight unit 20 may be disposed below the display panel 10 and may emit light of a predetermined wavelength toward the display panel 10. The backlight unit 20 may include a light source (not illustrated) emitting light directly and a light guide plate (not illustrated) emitting light toward the display panel 10 by guiding the path of light provided by the light source. The backlight unit 20 will be described later in detail with reference to FIGS. 5 through 9.

The lower display panel SUB1 of the display panel 10 will hereinafter be described with reference to FIGS. 3 and 4. The subpixels of the first pixel PX1 will hereinafter be described, taking the first subpixel SPX1 as an example.

Figure 3:
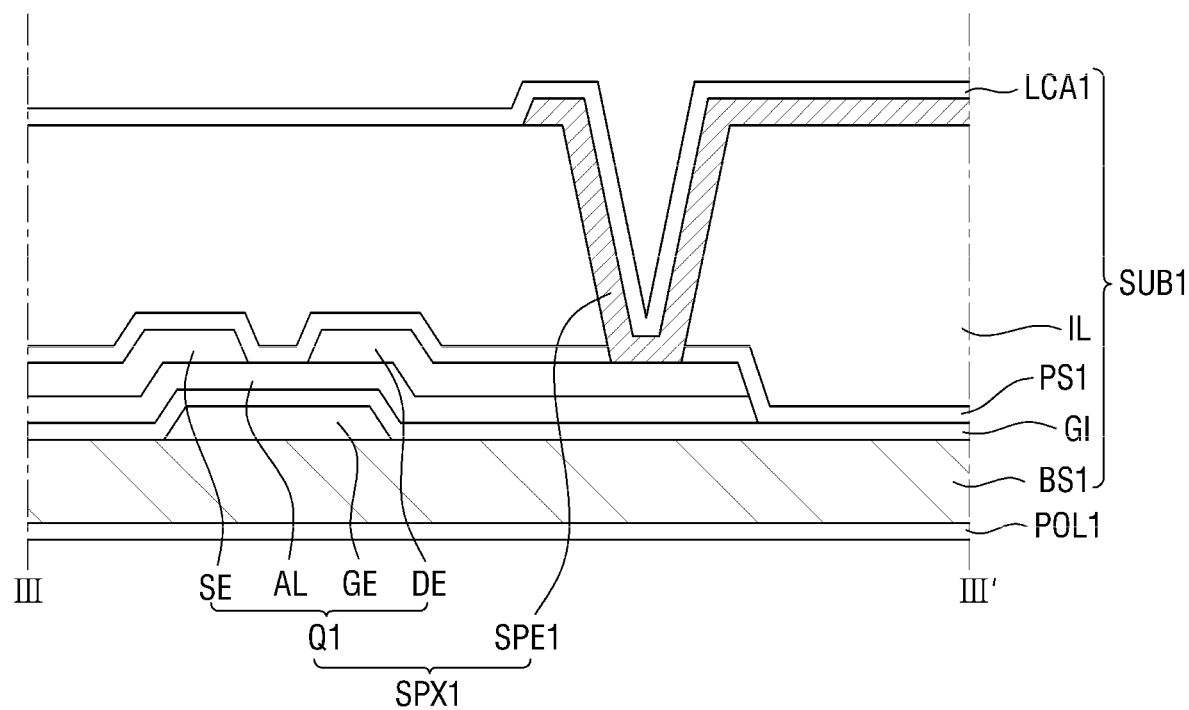
FIG. 3 is a cross-sectional view taken along line III-III' of FIG. 2.

FIG. 3 is a cross-sectional view taken along line III-III' of FIG. 2. FIG. 4 is a schematic view illustrating the first subpixel of FIG. 3.

Figure 4:
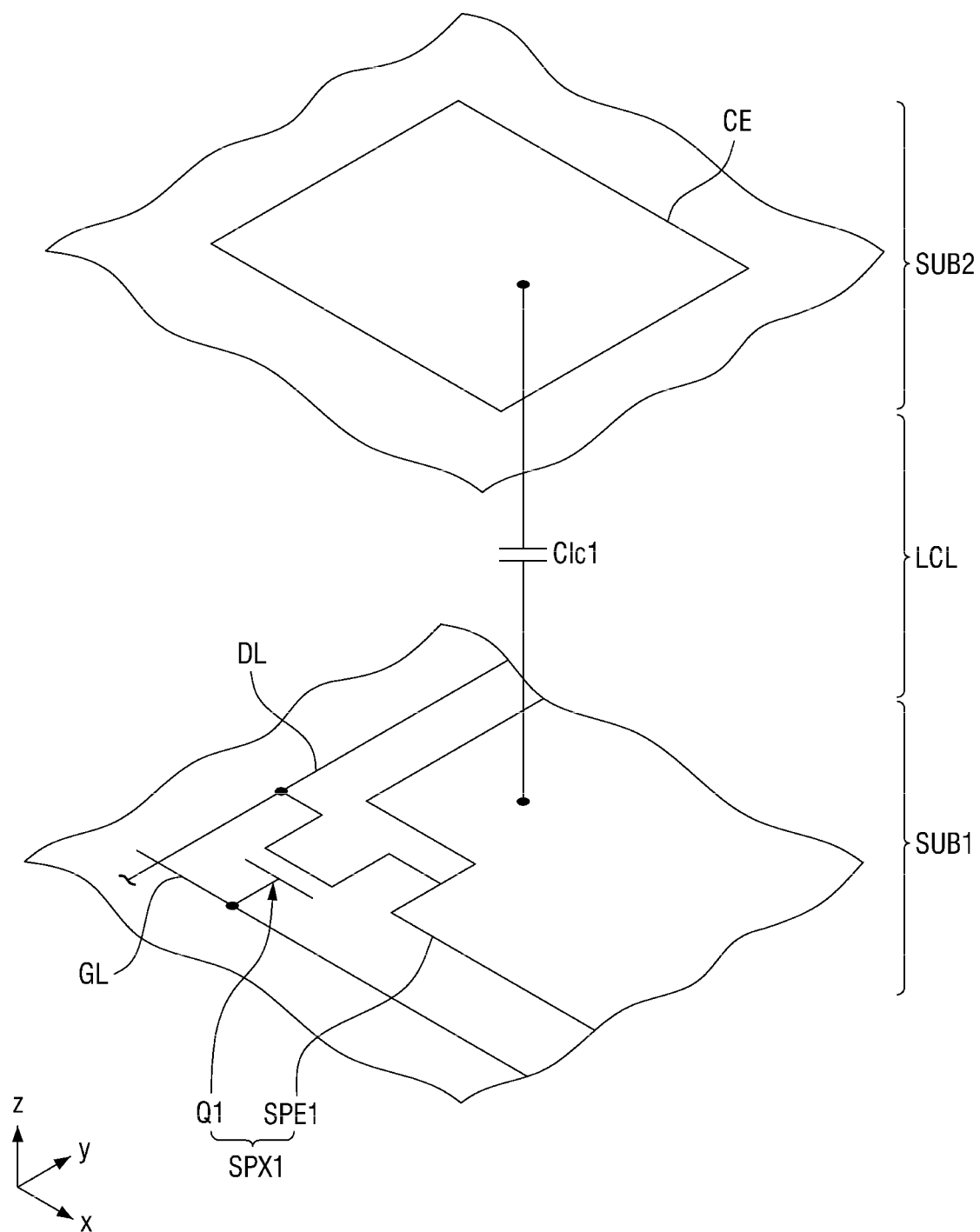
FIG. 4 is a schematic view illustrating a first subpixel of FIG. 3.

Referring to FIGS. 3 and 4, the lower display panel SUB1 may include a first substrate BS1, a switching element Q1 disposed on one surface (e.g., the top surface) of the first substrate BS1, and a first subpixel electrode SPE1 disposed on the switching element Q1. The lower display panel SUB1 may further include a first polarization layer POL1 disposed on another surface (e.g., the bottom surface) of the first substrate BS1. The upper display panel SUB2 may include a common electrode CE disposed to face the first subpixel electrode SPE1 of the lower display panel SUB1.

The first substrate BS1 may be a transparent insulating substrate. For example, the first substrate BS1 may be a substrate formed of a glass material, a quartz material, or a light-transmitting plastic material. In some embodiments, the first substrate BS1 may have flexibility, and the display device 1 may be a curved display device.

The first switching element Q1 may be disposed on the first substrate BS1. The first switching element Q1 may be disposed in the first subpixel SPX1 and may allow or block the transmission of driving signals to the first subpixel electrode SPE1, which will be described later. In one embodiment, the first switching element Q1 may be a thin-film transistor (TFT) including a gate electrode GE, an active layer AL disposed on the gate electrode GE, and source and drain electrodes SE and DE disposed on the active layer AL to be spaced apart from each other.

The gate electrode GE, which is the control terminal of the first switching element Q1, may be connected to a gate line GL and may receive a gate driving signal, the source electrode SE, which is the input terminal of the first switching element Q1, may be connected to a data line DL and may receive a data driving signal, and the drain electrode DE, which is the output terminal of the first switching element Q1, may be electrically connected to the first subpixel electrode SPE1. The active layer AL may be formed of amorphous silicon or polycrystalline silicon or may be formed of an oxide semiconductor. The active layer AL may serve as a channel of the first switching element Q1 and may turn the channel on or off in accordance with a gate voltage applied to the gate electrode GE. The gate electrode GE and the active layer AL may be insulated by an insulating film G1. Although not specifically illustrated, ohmic contact layers (not illustrated) may be further disposed between the active layer AL and the source and drain electrodes SE and DE when the active layer AL is formed of amorphous silicon or the like.

A first passivation layer PS1 may be disposed on the source and drain electrodes SE and DE to protect wires and electrodes formed therebelow. The first passivation layer PS1 may include an inorganic material. Examples of the inorganic material include silicon nitride (SiNx), silicon oxide (SiOx), silicon nitride oxide (SiNxOy), and silicon oxynitride (SiOxNy).

An intermediate layer IL may be disposed on the first switching element Q1. The intermediate layer IL can electrically insulate elements formed thereabove from elements formed therebelow and may planarize height differences generated by multiple elements stacked on the first substrate BS1. The intermediate layer IL may include one or more layers. For example, the intermediate layer IL may be formed of an organic material or an inorganic material or may have a stack of a layer formed of an organic material and a layer formed of an inorganic material.

The first subpixel electrode SPE1 may be disposed on the intermediate layer IL. The first subpixel electrode SPE1 may control the alignment direction of liquid crystal molecules in a corresponding pixel by generating an electric field in the liquid crystal layer LCL together with the common electrode CE, which will be described later. The first subpixel electrode SPE1 may be electrically connected to the drain electrode DE of the first switching element Q1 via a contact hole formed in the intermediate layer IL. The first subpixel electrode SPE1 may be disposed in the first subpixel SPX1 and may thus receive a voltage via the first switching element Q1. The first subpixel electrode SPE1 may be a transparent electrode formed of a transparent conductive material. Examples of the transparent conductive material include indium tin oxide (ITO) and indium zinc oxide (IZO). FIG. 2 illustrates that the first subpixel electrode SPE1 is a non-patterned electrode with no slits, but in other embodiments, the first subpixel electrode SPE1 may include radial slits.

A first liquid crystal alignment layer LCA1 may be disposed on the first subpixel electrode SPEL The first liquid crystal alignment layer LCA1 may induce the initial alignment of liquid crystal molecules in the liquid crystal layer LCL. The term "initial alignment of liquid crystal molecules", as used herein, refers to the alignment of liquid crystal molecules in the absence of an electric field in the liquid crystal layer LCL. The first liquid crystal alignment layer LCA1 may include a polymer organic material having an imide group in the repeating unit of the main chain thereof.

The first polarization layer POL1 may be disposed on an optical path between the first substrate BS1 and the backlight unit 20 of FIG. 1. In one embodiment, the first polarization layer POL1 may be disposed below the first substrate BS1. However, the location of the first polarization layer POL1 is not particularly limited. In another embodiment, the first polarization layer POL1 may be disposed between the first substrate BS1 and the liquid crystal layer LCL. In one embodiment, the first polarization layer POL1 may be a reflective polarization layer. In a case where the first polarization layer POL1 is a reflective polarization layer, the first polarization layer POL1 may include line grid patterns and may thus be able to transmit therethrough polarized components that are parallel to the transmission axis of the first polarization layer POL1 and to reflect polarized components that are parallel to the reflection axis of the first polarization layer POL1. The line grid patterns may include a metal material such as aluminum (Al), silver (Ag), gold (Au), copper (Cu), titanium (Ti), molybdenum (Mo), nickel (Ni), or an alloy thereof.

In a case where a reflective polarization layer is used, reflected light can be recycled and emitted, and as a result, the luminance gain of the display device 1 can be improved.

In one embodiment, the first polarization layer POL1 may be in direct contact with the first substrate BS1. That is, the first polarization layer POL1 may be formed on one surface of the first substrate BS1 through a continuous process. In another embodiment, the first polarization layer POL1 may be bonded to one surface of the first substrate BS1 through a separate adhesive member. Here, the adhesive member may be a pressure sensitive adhesive member (PSA) or an optically transparent adhesive member such as an optically clear adhesive (OCA) or an optically clear resin (OCR).

The common electrode CE may be disposed on the upper display panel SUB2. The first subpixel electrode SPE1 may at least partially overlap with the common electrode CE and the lower display panel SUB1 in a vertical direction. Accordingly, the first subpixel SPX1 may include a first liquid crystal capacitor Clc1 formed by the first subpixel electrode SPE1 and the common electrode CE overlapping with each other.

Backlight units according to embodiments of the present disclosure will hereinafter be described with reference to FIGS. 5 through 9.

Figure 5:
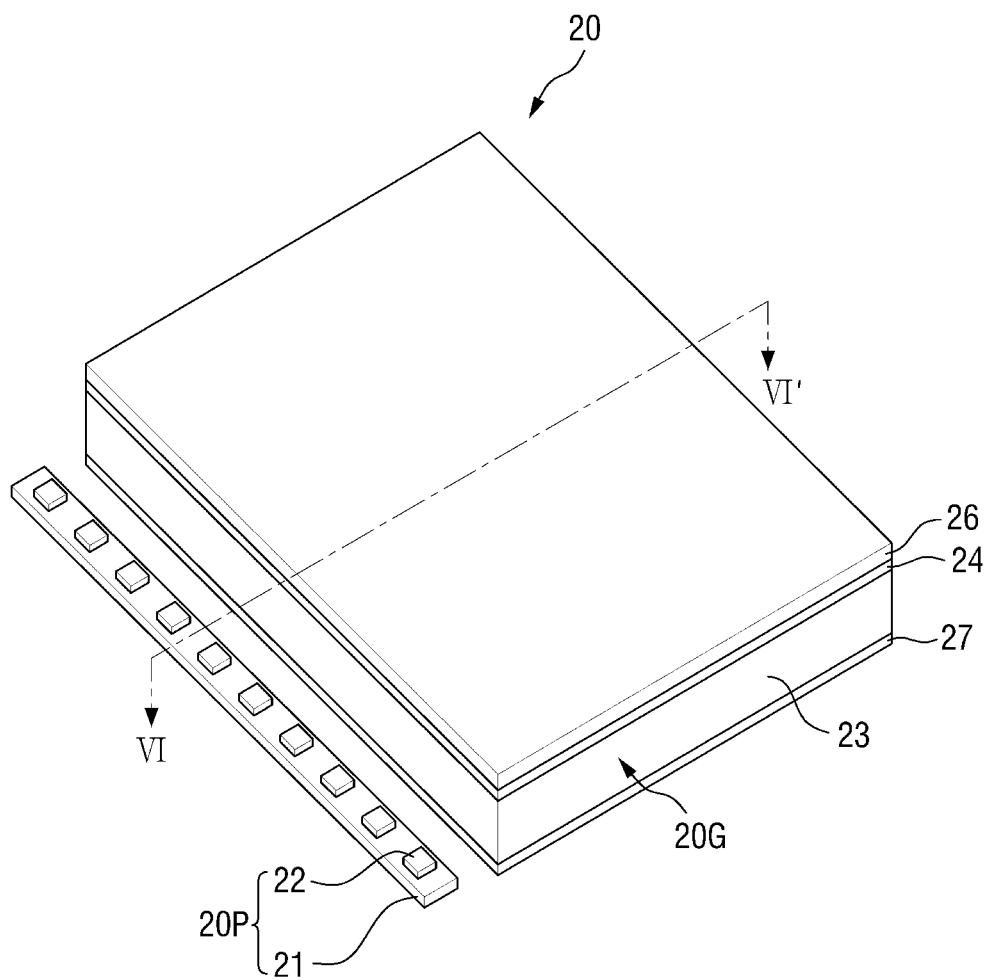
FIG. 5 is a perspective view of a backlight unit according to an embodiment of the present disclosure.
Figure 6:
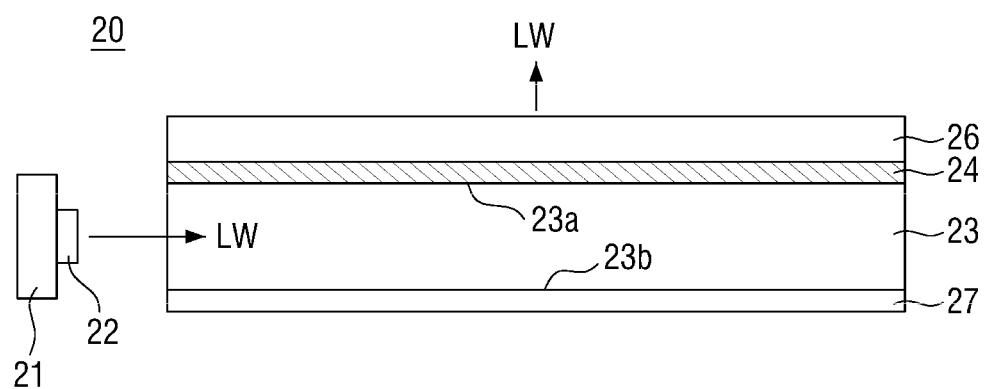
FIG. 6 is a cross-sectional view taken along line VI-VI' of FIG. 5.
Figure 7:
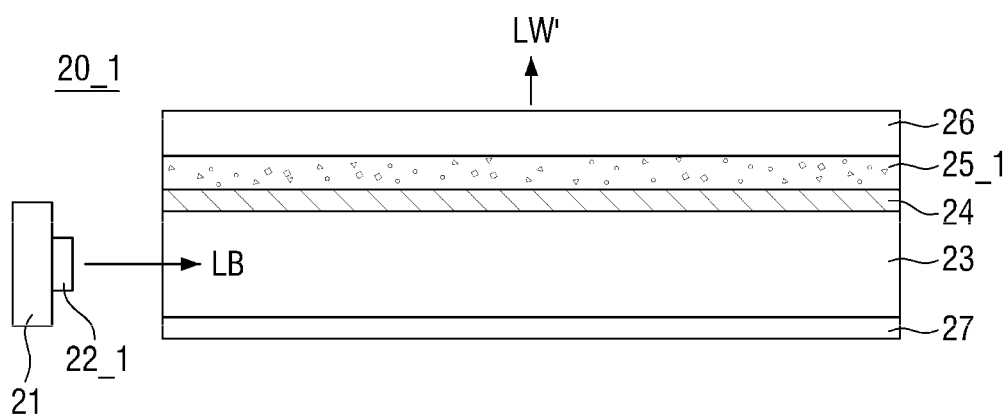
FIGS. 7 and 8 are cross-sectional views of backlight units according to other embodiments of the present disclosure.
Figure 8:
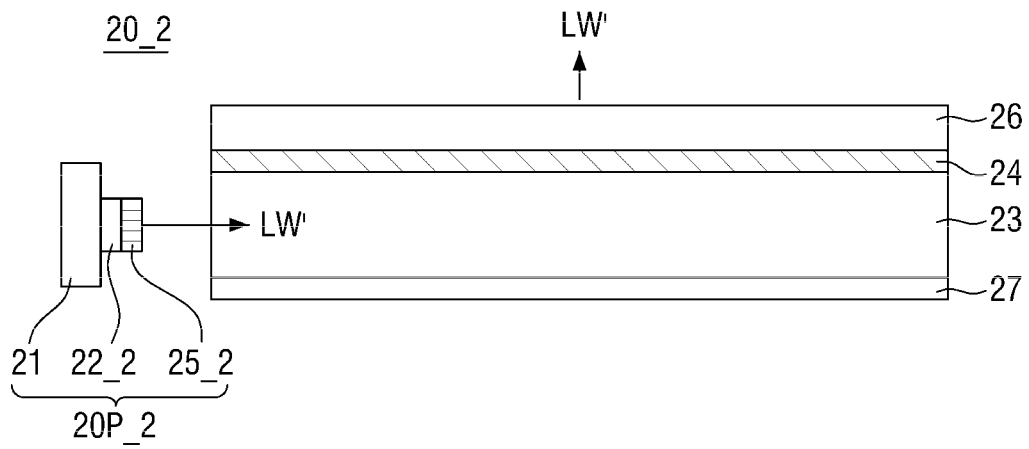

FIG. 5 is a perspective view of a backlight unit according to an embodiment of the present disclosure. FIG. 6 is a cross-sectional view taken along line VI-VI' of FIG. 5. FIGS. 7 and 8 are cross-sectional views of backlight units according to other embodiments of the present disclosure.

Figure 9:
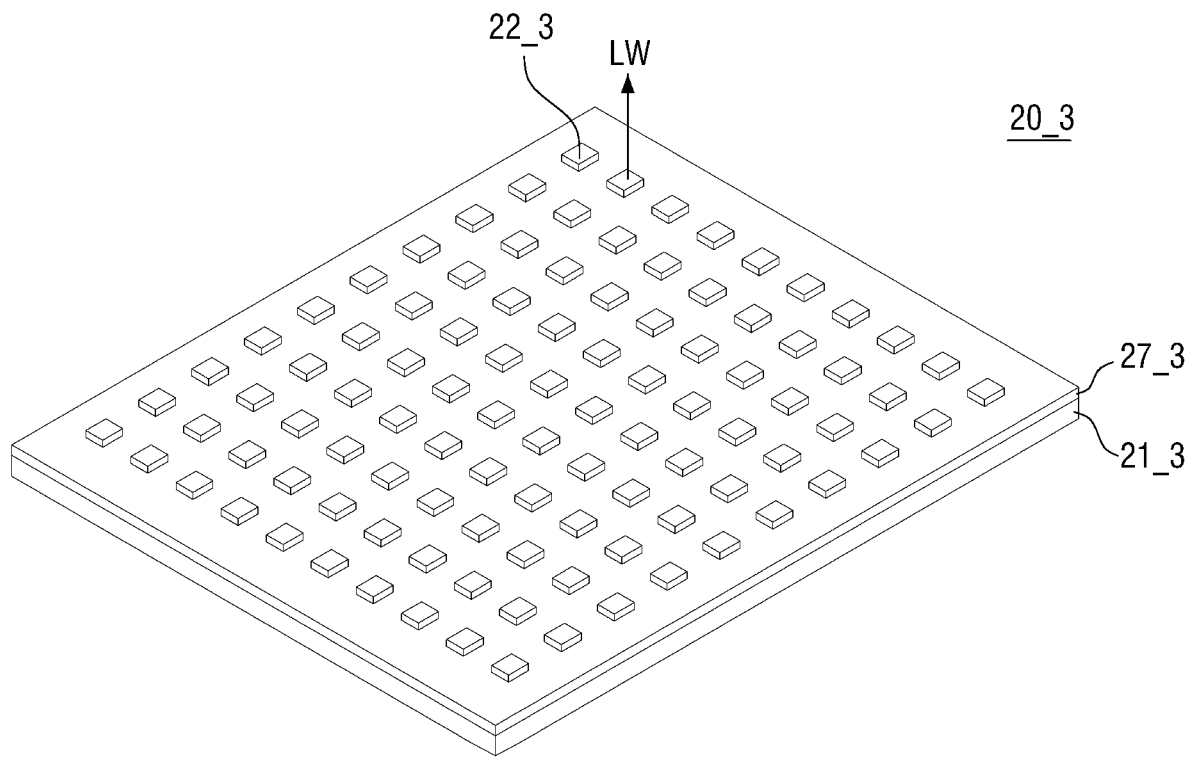
FIG. 9 is a perspective view of a backlight unit according to another embodiment of the present disclosure.

FIG. 9 is a perspective view of a backlight unit according to another embodiment of the present disclosure.

Referring to FIGS. 5 and 6, a backlight unit 20 may include an optical member 20G and a light-emitting element package 20P. The optical member 20G may include a light guide plate 23, a low refraction layer 24 disposed on the light guide plate 23, one or more optical sheets 26 disposed on the low refraction layer 24, and a reflective member 27 disposed below the light guide plate 23. The light-emitting element package 20P may include a printed circuit board (PCB) 21 and light-emitting elements 22.

The light guide plate 23 guides the traveling path of light. The light guide plate 23 may be generally in the shape of a polygonal column. The planar shape of the light guide plate 23 may be rectangular, but the present disclosure is not limited thereto. For example, the light guide plate 23 may have a rectangular shape in a plan view and may be in the shape of a hexagonal column having a top surface 23a, a bottom surface 23b, and four side surfaces.

In one embodiment, each of the top and bottom surfaces 23a and 23b of the light guide plate 23 may fall on a single plane, and the planes on which the top and bottom surfaces 23a and 23b of the light guide plate 23 fall may be substantially parallel to each other so that the light guide plate 23 may generally have a uniform thickness. However, the present disclosure is not limited to this embodiment. In another embodiment, each of the top and bottom surfaces 23a and 23b may fall on multiple planes, and the planes on which the top and bottom surfaces 23a and 23b fall may intersect each other. For example, the light guide plate 23 may be wedge-shaped so that it may become thinner from one side surface (e.g., an incident surface) thereof to another side surface (e.g., an opposing surface opposite to the incident surface) thereof. In another example, the bottom surface 23b of the light guide plate 23 may be upwardly inclined to a particular point and may then become parallel to the top surface 23a of the light guide plate 23 so that the thickness of the light guide plate 23 may gradually decrease from one side surface (e.g., the incident surface) to another side surface (e.g., the opposing surface) thereof and may then become uniform.

The material of the light guide plate 23 is not particularly limited, and the light guide plate 23 may be formed of, for example, a glass material, a quartz material, or a plastic material.

The light-emitting element package 20P may include the PCB 21 and the light-emitting elements 22 mounted on the PCB 21. The light-emitting element package 20P may be disposed adjacent to at least one side surface of the light guide plate 23 and may provide light. FIGS. 5 through 9 illustrate that multiple light-emitting elements 22 are mounted on the PCB 21 and are disposed adjacent to a side surface of the light guide plate 23 corresponding to one long side of the light guide plate 23, but the present disclosure is not limited thereto. Alternatively, the light-emitting element package 20P may be disposed adjacent to both side surfaces of the light guide plate 23 corresponding to both long sides of the light guide plate 23 or one or both side surfaces of the light guide plate 23 corresponding to one or both short sides of the light guide plate 23.

The light-emitting elements 22 may be mounted on the PCB 21. The light-emitting elements 22 may emit white light LW, but the present disclosure is not limited thereto. Alternatively, the light-emitting elements 22 may emit blue light or near ultraviolet light (NUV). Light emitted from the light-emitting elements 22 may have a Lambertian distribution.

The low refraction layer 24 is disposed on the top surface 23a of the light guide plate 23. The low refraction layer 24 may be formed directly on the top surface 23a of the light guide plate 23 and may thus be in contact with the top surface 23a of the light guide plate 23. The low refraction layer 24 may help total reflection at the top surface 23a of the light guide plate 23.

Specifically, in order to efficiently guide light from the incident surface to the opposing surface of the light guide plate 23, it is preferable that total internal reflection is effectively performed at the top and bottom surfaces 23a and 23b of the light guide plate 23. One of the conditions for causing total internal reflection in the light guide plate 23 is that the refractive index of the light guide plate 23 is greater than the refractive index of a medium that forms an optical interface with the light guide plate 23. As the refractive index of the medium that forms the optical interface with the light guide plate 23 becomes smaller, the total reflection critical angle of the light guide plate 23 becomes smaller, and more total internal reflection can occur.

For example, in a case where the light guiding plate 23 is formed of glass having a refractive index of about 1.5, the bottom surface 23b of the light guiding plate 23 is exposed to an air layer having a refractive index of about 1 to form an optical interface with the air layer, and as a result, total reflection can occur sufficiently. Also, light emitted through the bottom surface 23b of the light guide plate 23 can be effectively made to enter the light guide plate 23 via the reflective member 27, which is disposed on the bottom surface 23b of the light guide plate 23.

On the other hand, because other optical function layers are stacked on and integrated into the top surface 23a of the light guide plate 23, it is more difficult to cause total reflection at the top surface 23a than at the bottom surface 23b of the light guide plate 23. For example, if a material layer having a refractive index of 1.5 or greater is stacked on the top surface 23a of the light guide plate 23, total reflection cannot be performed at the top surface 23a of the light guide plate 23, and if a material layer whose refractive index does not much differ from the refractive index of the light guide plate 23 is stacked on the top surface 23a of the light guide plate 23, total reflection may occur, but not sufficiently, because of a large total reflection critical angle.

The low refraction layer 24, which forms an optical interface with the top surface 23a of the light guide plate 23, may have a refractive index lower than that of the light guide plate 23 so that total reflection may occur at the top surface 23a of the light guide plate 23. The difference between the refractive index of the light guide plate 23 and the refractive index of the low refraction layer 24 may be 0.2 or greater. If the refractive index of the low refraction layer 24 is smaller than the refractive index of the light guide plate 23 by 0.2 or greater, total reflection can occur sufficiently through the top surface 23a of the light guide plate 23. There is no upper limit to the difference between the refractive index of the light guide plate 23 and the refractive index of the low refraction layer 24, but the difference between the refractive index of the light guide plate 23 and the refractive index of the low refraction layer 24 may be 1 or less in consideration of the material of the light guide plate 23 and the refractive index of the low refraction layer 24.

The refractive index of the low refraction layer 24 may be in the range of 1.2 to 1.4. Generally, as the refractive index of a solid medium is closer to 1, the manufacturing cost of the solid medium considerably increases. If the refractive index of the low refraction layer 24 is 1.2 or greater, an excessive increase in the manufacturing cost of the low refraction layer 24 can be prevented. Also, the refractive index of the low refraction layer 24 may be 1.4 or less, which is advantageous for sufficiently reducing the total reflection critical angle of the top surface 23a of the light guide plate 23.

In order to achieve such low refractive index, the low refraction layer 24 may include voids. The voids may be in a vacuum or may be filled with an air layer or a gas. The voids may be defined by particles or matrices. The voids will hereinafter be described with reference to FIGS. 10A and 10B.

Figure 10A:
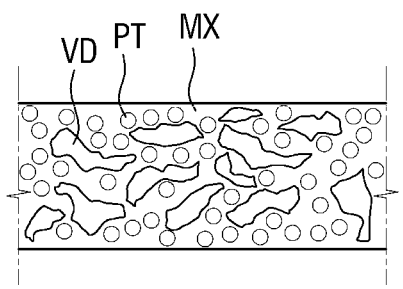
FIGS. 10A and 10B are cross-sectional views of low refraction layers according to embodiments of the present disclosure.
Figure 10B:
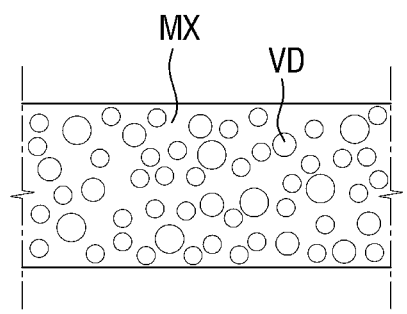

FIGS. 10A and 10B are cross-sectional views of low refraction layers according to embodiments of the present disclosure.

In one embodiment, as illustrated in FIG. 10A, the low refraction layer 24 may include particles PT and voids VD distributed in matrices MX. The particles PT may be fillers controlling the refractive index and the mechanical strength of the low refraction layer 24.

For example, the particles PT and the matrices MX may be mixed into a solvent and may then be dried and/or cured so that the solvent evaporates, and as a result, the voids VD may be formed in the matrices MX.

In another embodiment, as illustrated in FIG. 10B, the low refraction layer 24 may include matrices MX and voids VD, but may not include particles. For example, the low refraction layer 24, like a foamed resin, may include matrices MX and voids VD disposed in the matrices MX.

As illustrated in FIGS. 10A and 10B, in a case where the low refraction layer 24 includes the voids VD, the total refractive index of the low refraction layer 24 may be between the refractive index of the particles PT/the matrices MX and the refractive index of the voids VD. As described above, in a case where the voids VD are in a vacuum and have a refractive index of 1 or are filled with an air layer or gas having a refractive index of about 1, the total refractive index of the low refraction layer 24 may be 1.4 or less, for example, about 1.25, even if a material having a refractive index of 1.4 or greater is used as the particles PT/the matrices MX. For example, the particles PT may be formed of an inorganic material such as $SiO_2$, $Fe_2O_3$, or $MgF_2$, and the matrices MX may be formed of an organic material such as polysiloxane or may be formed of another organic material or an inorganic material.

Referring again to FIGS. 5 and 6, the low refraction layer 24 may have a thickness of 0.4 μm to 2 μm. When the thickness of the low refraction layer 24 is 0.4 μm or greater and thus falls within the range of visible light wavelengths, the low refraction layer 24 can form an effective optical interface with the top surface 23a of the light guide plate 23, and as a result, total reflection can occur properly according to Snell's law. If the low refraction layer 24 is too thick, the optical member 20G may not be properly thinned down, the manufacturing cost of the optical member 20G may increase, and the luminance of the optical member 20G may be deteriorated. Thus, the low refraction layer 24 may be formed to a thickness of 2 μm or less.

The low refraction layer 24 may be formed by, for example, a coating method. For example, the low refraction layer 24 may be formed by coating the top surface 23a of the light guide plate 23 with a composition for forming the low refraction layer 24 and drying and curing the composition for forming the low refraction layer 24. The composition for forming the low refraction layer 24 may be coated by slit coating, spin coating, roll coating, spray coating, or inkjet printing, but the present disclosure is not limited thereto. That is, various deposition methods may be used to coat the composition for forming the low refraction layer 24.

Although not specifically illustrated, a barrier layer may be further disposed between the low refraction layer 24 and the light guide plate 23. The barrier layer prevents the infiltration of moisture and/or oxygen. The barrier layer may include an inorganic material. Examples of the inorganic material include silicon nitride (SiNx), silicon oxide (SiOx), silicon nitride oxide (SiNxOy), and silicon oxynitride (SiOxNy). The barrier layer may be formed by, for example, a deposition method such as chemical vapor deposition (CVD).

The backlight unit 20 may further include one or more optical sheets 26. The optical sheets 26 may be disposed on the low refraction layer 24. The optical sheets 26 are illustrated as being disposed directly on the optical member 20G, but the present disclosure is not limited thereto. Alternatively, the optical sheets 26 may be accommodated in a space between the optical member 20G and the display panel 10 of FIG. 1, surrounded by a coupling member. The optical sheets 26 may include at least one of a prism sheet, a diffusion sheet, a lenticular lens sheet, and a microlens sheet. The optical sheets 26 can improve the emission quality of the backlight unit 20 by modulating the optical characteristics (e.g., condensing, diffusion, scattering, or polarization characteristics) of light emitted from the light-emitting element package 20P.

The reflective member 27 may be disposed below the light guide plate 23. The reflective member 27 may include a reflective film or a reflective coating layer. The reflective member 27 reflects emitted light toward the bottom surface 23b of the light guide plate 23 and thus allows the emitted light to enter the light guide plate 23 again. The reflective member 27 is illustrated as being disposed below, and in contact with, the bottom of the light guide plate 23, but the present disclosure is not limited thereto. Alternatively, an air layer may be formed between the light guide plate 23 and the reflective member 27.

Although not specifically illustrated, a diffusion pattern may be disposed on the bottom surface 23b of the light guide plate 23. The diffusion pattern changes the angle of light traveling inside the light guide plate 23 through total reflection and thus allows the light to be emitted out of the light guide plate 23.

The white light LW emitted from the light-emitting elements 22 may be incident upon the incident surface of the light guide plate 23 and may be emitted through the top surface 23a of the light guide plate 23. Specifically, the white light LW entering the light guide plate 23 may be totally reflected and/or reflected by the low refraction layer 24 and the reflective member 27 and may thus be guided toward the opposing surface of the light guide plate 23. Then, the white light LW may be emitted through the top surface 23a of the light guide plate 23 by the diffusion pattern disposed on the bottom surface 23b of the light guide plate 23.

The embodiments of FIGS. 7 and 8 differ from the embodiments of FIGS. 5 and 6 in that a wavelength conversion material is further provided, and the embodiment of FIG. 9 differs from the embodiment of FIGS. 5 and 6 in that a light guide plate is not provided. In FIGS. 5 through 9, like reference numerals indicate like elements, and thus, detailed descriptions thereof will be omitted. The embodiments of FIGS. 7 through 9 will hereinafter be described, focusing mainly on the difference(s) with the embodiment of FIGS. 5 and 6.

Referring to FIGS. 7 and 8, a backlight unit 20_1 or 20_2 may include a wavelength conversion layer 25_1 or 25_2. Referring first to FIG. 7, the wavelength conversion layer 25_1 may be disposed on the top surface of a low refraction layer 24. A passivation layer for preventing the infiltration of moisture and/or oxygen may be disposed between the wavelength conversion layer 25_1 and the low refraction layer 24, but the present disclosure is not limited thereto. Alternatively, the wavelength conversion layer 25_1 may be disposed to be in direct contact with the low refraction layer 24.

The wavelength conversion layer 25_1 converts the wavelength of at least some light incident thereupon. The wavelength conversion layer 25_1 may include a binder layer and wavelength conversion particles dispersed in the binder layer. The wavelength conversion layer 25_1 may further include scattering particles dispersed in the binder layer. FIG. 7 illustrates that various wavelength conversion particles and scattering particles are dispersed in the binder layer of the wavelength conversion layer 25_1.

The binder layer, which is a medium in which the wavelength conversion particles are dispersed, may include various resin compositions that are typically referred to as binders, but the present disclosure is not limited thereto. Nearly any type of medium that can disperse the wavelength conversion particles and/or the scattering particles therein can be referred to as a binder layer regardless of its actual name, additional function(s), and composition.

The wavelength conversion particles, which are particles converting the wavelength of incident light, may be, for example, quantum dots (QDs), a fluorescent material or a phosphor material. The quantum dots are a material having a nanometer-sized crystal structure and consist of several hundreds to thousands of atoms. Due to the small size of the quantum dots, an energy band gap increases, i.e., a quantum confinement effect occurs. In response to light with higher energy than the energy band gap being incident upon quantum dots, the quantum dots absorb the incident light to be excited, emit light of a predetermined wavelength, and then fall to the ground state. The light emitted by the quantum dots has a value corresponding to the energy band gap. The emission characteristics of the quantum dots, resulting from quantum confinement, can be controlled by adjusting the size and the composition of the quantum dots.

The quantum dots may include at least one of, for example, a Group II-VI compound, a Group II-V compound, a Group III-VI compound, a Group III-V compound, a Group IV-VI compound, a Group I-III-VI compound, a Group II-IV-VI compound, and a Group II-IV-V compound.

Each of the quantum dots may include a core and a shell overcoating the core. The core may include at least one of, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si, and Ge. The sell may include at least one of, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, T1N, T1P, TlAs, T1Sb, PbS, PbSe, and PbTe.

The wavelength conversion particles may include a plurality of groups of wavelength conversion particles converting incident light into different wavelengths. For example, the wavelength conversion particles may include first wavelength conversion particles converting incident light of a predetermined wavelength into first-color light and second wavelength conversion particles converting the incident light of the predetermined wavelength into second-color light. In one embodiment, light emitted from light-emitting elements 22_1 to be incident upon the wavelength conversion particles may be blue light LB, the first-color light may be red light, and the second-color light may be green light. For example, the blue light LB may be light having a central wavelength of 430 nm to 470 nm, the red light may be light having a central wavelength of 610 nm to 650 nm, and the green light may be light having a central wavelength of 530 nm to 570 nm. However, the wavelengths of the blue light LB, the red light, and the green light are not limited to this example and should be understood as encompassing all wavelength bands that are typically perceived as blue light, green light, and red light.

In the above embodiment, some blue light LB incident upon the wavelength conversion layer 25_1 may be incident upon the first wavelength conversion particles to be converted into, and emitted as, green light through the wavelength conversion layer 25_1, other blue light LB incident upon the wavelength conversion layer 25_1 may be incident upon the second wavelength conversion particles to be converted into, and emitted as, red light through the wavelength conversion layer 25_1, and still other blue light LB incident upon the wavelength conversion layer 25_1 may be emitted as it is without being incident upon the first wavelength conversion particles or the second wavelength conversion particles. Thus, light transmitted through the wavelength conversion layer 25_1 may include all red light, green light, and blue light. By appropriately controlling the ratio of emitted light of different colors, white light or light of various other colors can be displayed. Beams of light converted by the wavelength conversion layer 25_1 are concentrated on narrow wavelength bands and thus have a sharp spectrum with a narrow half width. Accordingly, color reproducibility can be improved by filtering light having such spectrum through color filters to realize colors. For example, white light LW' emitted through the wavelength conversion layer 25_1 can have a sharper spectrum than the white light LW of FIG. 6 and can contribute to improving color reproducibility when realizing colors.

In another embodiment, incident light may be short-wavelength light such as ultraviolet (UV) light, and three groups of wavelength conversion particles converting the short-wavelength light into blue light, green light, and red light may be provided in the wavelength conversion layer 25_1 to emit the white light LW'.

The wavelength conversion layer 25_1 may further include the scattering particles. The scattering particles may be non-quantum dot particles with no wavelength conversion function. The scattering particles scatter incident light and thus allow more of the incident light to be incident upon the wavelength conversion particles. Also, the scattering particles can uniformly control the emission angle of light of each wavelength. Specifically, when light is incident upon the wavelength conversion particles and is then wavelength-converted and emitted, the emitted light has a random scattering characteristic. If the scattering particles are not provided in the wavelength conversion layer 25_1, green light and red light emitted after colliding with the wavelength conversion particles may have a scattering emission characteristic, but blue light emitted without colliding with the wavelength conversion particles may not have a scattering emission characteristic. Thus, the emission amount of blue light, green light, and red light may vary depending on the emission angle of the light. Since the scattering particles impart a scattering emission characteristic even to blue light emitted without colliding with the wavelength conversion particles, the emission angle of light of each wavelength can be uniformly controlled. TiO$_2$ or SiO$_2$ may be used as the scattering particles.

The wavelength conversion layer 25_1 may be formed by, for example, a coating method. For example, the wavelength conversion layer 25_1 may be formed by coating a light guide plate 23 where the low refraction layer 24 is formed with a wavelength conversion composition and drying and curing the wavelength conversion composition, but the present disclosure is not limited thereto. That is, various deposition methods may be used to coat the wavelength conversion composition.

The embodiment of FIG. 8 differs from the embodiment of FIG. 7 in that the wavelength conversion layer 25_2 is disposed on light-emitting elements 22_2.

Referring to FIG. 8, a light-emitting element package 20P_2 may include a PCB 21, the light-emitting elements 22_2 mounted on the PCB 21, and the wavelength conversion layer 25_2 disposed on the light-emitting elements 22_2.

Light emitted from the light-emitting elements 22_2 may be blue light. The wavelength conversion layer 25_2 may include first and second wavelength conversion materials. Some blue light emitted from the light-emitting elements 22_2 may be converted into red light by the first wavelength conversion material, other blue light emitted from the light-emitting elements 22_2 may be converted into green light by the second wavelength conversion material, and still other blue light emitted from the light-emitting elements 22_2 may be emitted as it is without reacting to the first and second wavelength conversion materials. The red light, the green light, and the blue light emitted from the wavelength conversion layer 25_2 may be mixed together and may thus generate white light LW'. That is, light emitted from the light-emitting element package 20P_2 to be incident upon a light guide plate 23 may be the white light LW'. The white light LW' may be incident upon an incident surface of the light guide plate 23, may be guided toward an opposing surface of the light guide plate 23, and may be emitted through the top surface of the light guide plate 23. Since in the embodiment, the wavelength conversion layer 25_2 is disposed in the light-emitting element package 20P_2, which is disposed on a side of the light guide plate 23, a thinner backlight unit 20_2 than the backlight unit 20_1 of FIG. 7 can be provided.

Referring to FIG. 9, a backlight unit 20_3 may include a PCB 21_3 having a circuit pattern formed thereon, a plurality of light-emitting elements 22_3 disposed on the PCB 21_3 to be spaced apart from one another, and a reflective member 27_3 disposed between the PCB 21_3 and the light-emitting elements 22_3.

The light-emitting elements 22_3 may be disposed to be a predetermined distance apart from one another for the luminance uniformity of the backlight unit 20_3. For example, the light-emitting elements 22_3 may be uniformly spaced apart from one another in horizontal and vertical directions and may be arranged in a matrix. In another example, the light-emitting elements 22_3 may be arranged side-by-side in the vertical direction and may be arranged in zigzags in the horizontal direction. The arrangement of the light-emitting elements 22_3 is not particularly limited, and the light-emitting elements 22_3 may be arranged in various manners other than those set forth herein to achieve luminance uniformity. The PCB 21_3 may include coupling holes (not illustrated) and coupling members (not illustrated) for arranging the light-emitting elements 22_3 on the PCB 21_3.

White light LW may be emitted from the light-emitting elements 22_3, but the present disclosure is not limited thereto. Alternatively, the combination of beams of light emitted from the light-emitting elements 22_3 may be white light. For example, some light-emitting elements 22_3 may emit red light, other light-emitting elements 22_3 may emit green light, and still other light-emitting elements 22_3 may emit blue light. In another example, some light-emitting elements 22_3 may emit light of an arbitrary color, and other light-emitting elements 22_3 may emit light of a color that is complementary to the arbitrary color. As a result, the backlight unit 20_3 can provide the white light LW toward the display panel 10 of FIG. 1.

The reflective member 27_3 may be disposed between the PCB 21_3 and the light-emitting elements 22_3 and may reflect light emitted downwardly from the light-emitting elements 22_3 in an upward direction. The reflective member 27_3 may include a material capable of reflecting light such as Al, but the present disclosure is not limited thereto.

Although not specifically illustrated, the backlight unit 20_3 may further include a diffusion plate. The diffusion plate may be disposed on the light-emitting elements 22_3. The diffusion plate can receive and diffuse light emitted from the light-emitting elements 22_3. That is, the diffusion plate can improve the luminance uniformity of light emitted from the backlight unit 20_3. The diffusion plate may be directly attached to the tops of the light-emitting elements 22_3 or may be spaced apart from the light-emitting elements 22_3 by a predetermined distance with an air layer interposed therebetween.

Figure 11:
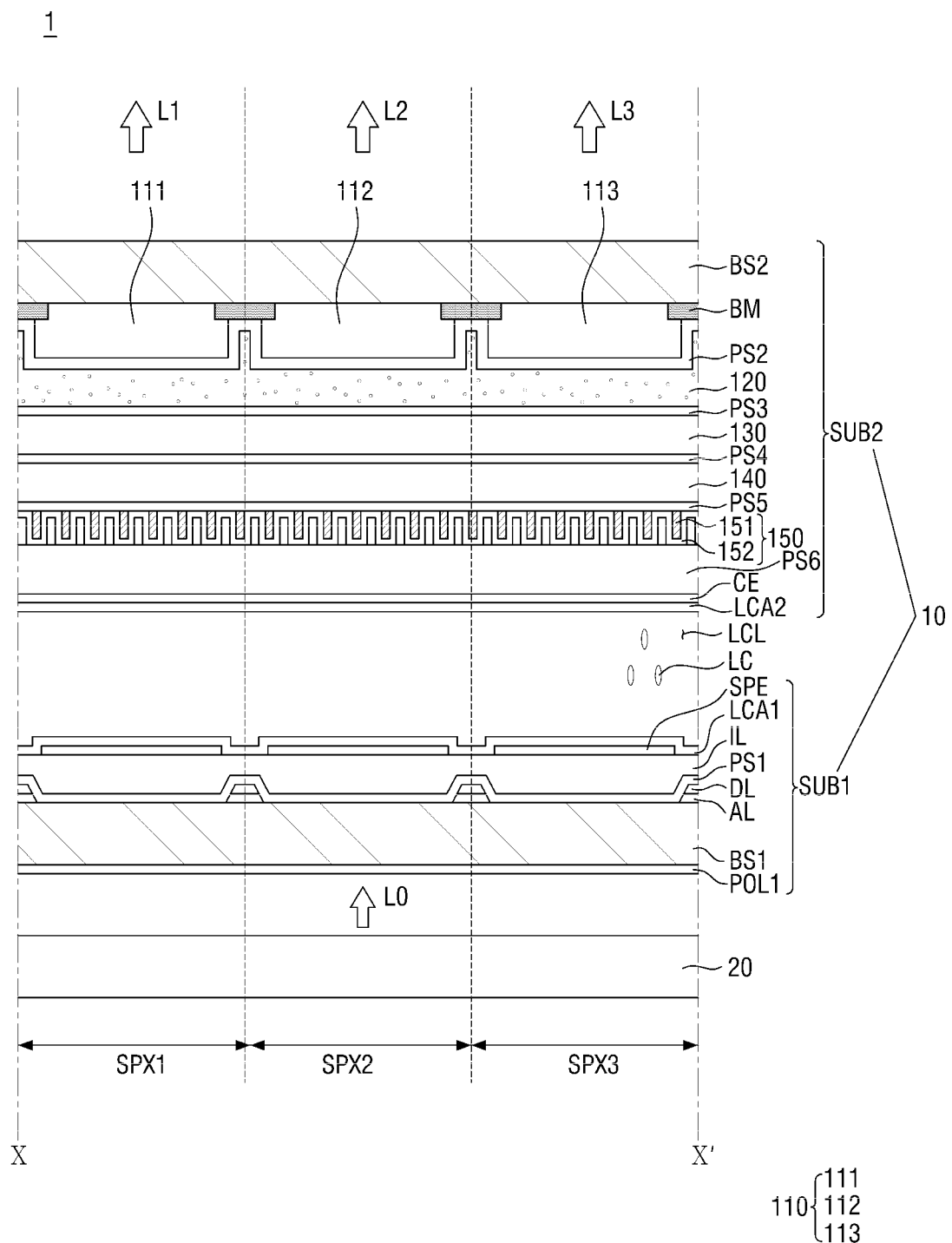
FIG. 11 is a cross-sectional view of the display device of FIG. 1.

FIG. 11 is a cross-sectional view of the display device of FIG. 1. As already mentioned above, the display device 1 may include the display panel 10 and the backlight unit 20. The display panel 10 may include the lower display panel SUB1, the upper display panel SUB2 facing the lower display panel SUB1, and the liquid crystal layer LCL interposed between the lower and upper display panels SUB1 and SUB2. The upper display panel SUB2 and the liquid crystal layer LCL will hereinafter be described with reference to FIG. 11.

Referring to FIG. 11, the upper display panel SUB2 may include a second substrate BS2, black matrices BM, color filter layers 110, a light scattering layer 120, a planarization organic layer 130, a planarization resin layer 140, a second polarization layer 150, the common electrode CE, and a second liquid crystal alignment layer LCA2.

The second substrate BS2 may be disposed to face the first substrate BS1. The second substrate BS2 may be a substrate formed of a transparent glass material, a quartz material, or a light-transmitting plastic material. In one embodiment, the second substrate BS2 may be formed of the same material as the first substrate BS1.

The black matrices BM may be disposed on the second substrate BS2. The black matrices BM may be disposed along the boundaries between adjacent subpixels and may prevent color mixing between neighboring subpixels by blocking the transmission of light. As illustrated in FIG. 11, the black matrix BM may be disposed along the boundaries between the first, second, and third subpixels SPX1, SPX2, and SPX3. That is, the black matrices BM may form openings that light can pass through on the first, second, and third subpixels SPX1, SPX2, and SPX3. The material of the black matrices BM is not particularly limited as long as the black matrices BM are capable of blocking the transmission of light. In one embodiment, the black matrices BM may include an organic material. In another embodiment, the black matrices BM may include a metal material such as chromium (Cr).

Although not specifically illustrated, a capping layer may be disposed on the black matrices BM. The capping layer may be disposed between the black matrices BM and the color filter layers 110, which will be described later. The capping layer may prevent the black matrices BM from being damaged or corroded in the process of fabricating the upper display panel SUB2. The material of the capping layer is not particularly limited. For example, the capping layer may include an inorganic insulating material such as silicon nitride or silicon oxide. The capping layer may not be provided.

Although not specifically illustrated, the black matrices BM may be disposed on the lower display panel SUB1 instead of disposing on the upper display panel. In one embodiment, in a case where the black matrices BM are disposed on the lower display panel SUB1, the black matrices BM may be disposed between the intermediate layer IL and the first liquid crystal alignment layer LCA1.

The color filter layers 110 may be disposed on the black matrices BM. The color filter layers 110 may at least partially overlap with the black matrices BM. The color filter layers 110 may include first, second, and third color filter layers 111, 112, and 113. The first color filter layer 111 may overlap with the first subpixel SPX1, the second color filter layer 112 may overlap with the second subpixel SPX2, and the third color filter layer 113 may overlap with the third subpixel SPX3.

The first, second, and third color filter layers 111, 112, and 113 may selectively transmit light of a predetermined wavelength band therethrough and may absorb and block other light.

In one embodiment, the first color filter layer 111 may be disposed in the opening formed in the first subpixel SPX1 by the black matrices BM. The first color filter layer 111 may selectively transmit therethrough first-color light L1 among beams of white light L0 provided by the backlight unit 20 and may absorb or reflect the other white light L0.

The second color filter layer 112 may be disposed in the opening formed in the second subpixel SPX2 by the black matrices BM. The second color filter layer 112 may selectively transmit therethrough second-color light L2 among the beams of white light L0 provided by the backlight unit 20 and may absorb or reflect the other white light L0.

The third color filter layer 113 may be disposed in the opening formed in the third subpixel SPX3 by the black matrices BM. The third color filter layer 113 may selectively transmit therethrough third-color light L3 among the beams of white light L0 provided by the backlight unit 20 and may absorb or reflect the other white light L0.

As already mentioned above, the first-color light L1 may be red light, the second-color light L2 may be green light, and the third-color light L3 may be blue light.

Each of the first, second, and third color filter layers 111, 112, and 113 may include a colorant or dye capable of absorbing light of a predetermined wavelength band, but the materials of the first, second, and third color filter layers 111, 112, and 113 are not particularly limited as long as the first, second, and third color filter layers 111, 112, and 113 can selectively transmit light of a predetermined wavelength band therethrough and can absorb light of another predetermined wavelength band.

The first, second, and third color filter layers 111, 112, and 113 may be disposed to be spaced apart from one another. That is, gaps may be formed between the color filter layers 110 to overlap with the black matrices BM, but the present disclosure is not limited thereto. Alternatively, no gaps may be formed between the color filter layers 110. Still alternatively, the color filter layers 110 may overlap with one another in regions that overlap with the black matrices BM.

In a plan view, the first, second, and third color filter layers 111, 112, and 113 may have the same area. In a case where the color filter layers 110 have the same area, the amounts of first-color light L1, second-color light L2, and third-color light L3 emitted out of the display device 1 can become uniform. However, the present disclosure is not limited to this. Alternatively, the color filter layers 110 may have different areas.

The first, second, and third color filter layers 111, 112, and 113 may be disposed on the first, second, and third subpixels SPX1, SPX2, and SPX3, respectively, to allow the first, second, and third subpixels SPX1, SPX2, and SPX3 to display red, green, and blue colors, respectively. Also, the first, second, and third color filter layers 111, 112, and 113 can improve the reflection of external light by the display device 1. External light incident upon the display device 1 may be light including all wavelength bands. In a case where external light passes through the color filter layers 110, light of colors that are not the color corresponding to each of the color filter layers 110 may be absorbed by the color filter layers 110. Also, in a case where light transmitted through the color filter layers 110 is reflected out of the display device 1 by a reflective surface inside the display device 1, some of the light may be absorbed by the color filter layers 110. That is, the amount of external light incident upon the display device 1 and then emitted out of the display device 1 may be much smaller than the total amount of external light incident upon the display device 1. Accordingly, the color filter layers 110 can improve the reflection of external light by the display device 1.

The second passivation layer PS2 may be disposed on the color filter layers 110 and on parts of the black matrices BM that do not overlap with the color filter layers 110. The second passivation layer PS2 may be disposed along the surfaces of the color filter layers 110 and may have a substantially uniform thickness. The second passivation layer PS2 may prevent the color filter layers 110 from being damaged or deteriorating due to the infiltration of moisture and/or oxygen into the color filter layers 110. The second passivation layer PS2 may be formed of an inorganic material such as silicon nitride, silicon oxide, silicon nitride oxide, or silicon oxynitride. For example, the second passivation layer PS2 may include silicon oxide and may be formed to a thickness of 0.1 μm.

The light scattering layer 120 may be disposed on the second passivation layer PS2. The light scattering layer 120 may be disposed along the surface of the second passivation layer PS2 and may have a substantially uniform thickness. The light scattering layer 120 may induce the scattering of incident light. That is, the light scattering layer 120 can improve the viewing angle characteristics of the display device 1.

In a case where the color filter layers 110 are spaced apart from one another to form gaps that overlap with the black matrices BM, the light scattering layer 120 may fill the gaps. If the light scattering layer 120 is disposed in the gap between the first and second color filter layers 111 and 112, light to be blocked by the black matrices BM may be scattered by the light scattering layer 120 and may thus be emitted out of the display device 1. That is, the luminance of the display device 1 can be improved.

The thickness of the light scattering layer 120 may be 1 µm to 6 µm. If the light scattering layer 120 is too thin, a sufficient scattering effect cannot be achieved. On the other hand, if the light scattering layer 120 is too thick, the front luminance of the display device 1 may be deteriorated. In one embodiment, the light scattering layer 120 may be 3 µm.

A third passivation layer PS3 may be disposed on the light scattering layer 120. The third passivation layer PS3 may be disposed along the surface of the light scattering layer 120 and may have a substantially uniform thickness. The third passivation layer PS3 may prevent the light scattering layer 120 from being damaged or deteriorating due to the infiltration of moisture and/or oxygen into the light scattering layer 120. The third passivation layer PS3 may be formed of an inorganic material such as silicon nitride, silicon oxide, silicon nitride oxide, or silicon oxynitride. For example, the third passivation layer PS3 may include silicon oxide and may be formed to a thickness of 0.1 µm.

The planarization organic layer 130 may be disposed on the third passivation layer PS3. The planarization organic layer 130 may reduce height differences generated by multiple elements stacked on the second substrate BS2. That is, the planarization organic layer 130 may be an overcoat layer. The planarization organic layer 130 may include one or more layers. For example, the planarization organic layer 130 may have a stack of multiple layers. The planarization organic layer 130 may be formed of an organic material having planarization characteristics. For example, the planarization organic layer 130 may include an organic material such as a cardo resin, an imide resin, or an acrylic resin. The planarization organic layer 130 may be disposed directly on the third passivation layer PS3 regardless of the distinction between the first, second, and third subpixels SPX1, SPX2, and SPX3. The planarization organic layer 130 may be formed to a thickness of 3µm to 6 µm.

The fourth passivation layer PS4 may be disposed on the planarization organic layer 130. The fourth passivation layer PS4 may include a non-metal inorganic material and may prevent the infiltration of moisture and/or oxygen into the planarization organic layer 130 and the elements stacked on the second substrate BS2. For example, the fourth passivation layer PS4 may include an inorganic material such as silicon oxide or silicon nitride. In one embodiment, the fourth passivation layer PS4 may include silicon oxide and may be formed to a thickness of 0.1 µm.

The planarization resin layer 140 may be disposed on the fourth passivation layer PS4. The planarization resin layer 140 may be disposed to further planarize the surface of the fourth passivation layer PS4 before the formation of the second polarizing layer 150, which will be described later. The material of the planarization resin layer 140 is not particularly limited as long as it has a height difference compensation function. For example, the planarization resin layer 140 may include an organic material such as an acrylic resin, an epoxy resin, an imide resin, or a cardo resin. After the formation of the planarization resin layer 140, the planarization resin layer 140 may be planarized by being placed in direct contact with a roller or the like.

In some embodiments, a fifth passivation layer PS5 may be disposed on the planarization resin layer 140. The fifth passivation layer PS5 may include a non-metal inorganic material. For example, the fifth passivation layer PS5 may include silicon oxide, silicon nitride, silicon nitride oxide, or silicon oxynitride. The fifth passivation layer PS5 may prevent the planarization resin layer 140 from being damaged in the process of forming the second polarizing layer 150, which will be described later, but the present disclosure is not limited thereto. Alternatively, in a case where the line patterns of the second polarizing layer 150 are formed by dry etching, the fifth passivation layer PS5 may serve as an etch stopper and may thus prevent the planarization resin layer 140 from being etched unintentionally. Also, the fifth passivation layer PS5 can improve the adhesion of the second polarizing layer 150 to the planarization resin layer 140 including an organic material, can prevent the second polarizing layer 150 from being damaged or corroded by impurities such as moisture/oxygen, and can thus improve the reliability and durability of the display device 1. In one embodiment, the fifth passivation layer PS5 may include silicon oxide and may be formed to a thickness of 0.1 µm.

In another embodiment, the fifth passivation layer PS5 may not be provided, and the second polarizing layer 150 may be disposed directly on the planarization resin layer 140.

In some embodiments, the planarization resin layer 140 and the fifth passivation layer PS5 may not be provided. Specifically, in a case where the planarization organic layer 130 can sufficiently compensate for height differences for the purpose of forming the second polarization layer 150 or surface planarization can be achieved by a separate polishing process, the planarization resin layer 140 and the fifth passivation layer PS5 may not be provided. In this case, the fourth passivation layer PS4 may perform the functions of the fifth passivation layer PS5.

The second polarizing layer 150 may be disposed on the fifth passivation layer PS5. Although not specifically illustrated, the second polarizing layer 150 may include a plurality of line patterns extending in one direction (e.g., the second direction Y) in a plan view and may thus form line grid patterns 151. The second polarizing layer 150 may serve as a polarizing element is performing an optical shutter function, e.g., an upper polarizing element, together with the liquid crystal layer LCL. For example, the second polarizing layer 150 may reflect polarized components that vibrate in a direction substantially parallel to the direction (i.e., the second direction Y) in which the line patterns of the second polarizing layer 150 extend) and may transmit therethrough polarized components that vibrate in a direction (i.e., the first direction X) in which the line patterns of the second polarizing layer 150 are spaced apart from one another. That is, the second polarizing layer 150 may be a reflective polarizing layer. The material of the line grid patterns 151 of the second polarizing layer 150 is not particularly limited as long as it is easy to process and has excellent reflection characteristics. For example, the line grid patterns 151 may include a metal material such as aluminum, silver, gold, copper, titanium, molybdenum, nickel, or an alloy thereof. In one embodiment, the thickness of the line grid patterns 151 may be 1500 Å to 2500 Å, preferably 2000 Å.

The second polarizing layer 150 may further include a low reflection metal layer 152. The low reflection metal layer 152 may be disposed on the line grid patterns 151 after the formation of the line grid patterns 151.

The line grid patterns 151 of the second polarizing layer 150 may be formed of a metal material. For example, the line grid patterns 151 may be formed of aluminum. Aluminum has excellent reflection characteristics and can thus reflect incident light from outside the display device 1 through the second substrate BS2. That is, due to the reflection of external light by the line grid patterns 151, problems such as glare may arise.

In a case where the low reflection metal layer 152 is disposed on the line grid patterns 151, at least some external light entering the display device 1 can be absorbed. The material of the low reflection metal layer 152 is not particularly limited. In one embodiment, the low reflection metal layer 152 may include MoTaOx and may be formed through deposition to a thickness of 200 Å to 400 Å, preferably 300 Å.

A sixth passivation layer PS6 may be disposed on the second polarization layer 150. The sixth passivation layer PS6 may be disposed directly on the second polarizing layer 150, may cover and protect the line grid patterns 151 of the second polarizing layer 150, and may insulate the common electrode CE and the second polarizing layer 150 from each other. Also, the sixth passivation layer PS6 may define voids between the line grid patterns 15 of the second polarizing layer 150. The voids may be empty or may be filled with a gas. The sixth passivation layer PS6 may include an organic material, an inorganic material, or a stack of an organic material and an inorganic material.

The common electrode CE may be disposed on the sixth passivation layer PS6. The common electrode CE may be a field generating electrode forming an electric field in the liquid crystal layer LCL together with the first, second, and third subpixel electrodes SPE1, SPE2, and SPE3. The common electrode CE may be disposed across multiple pixels, and a common voltage may be applied to the common electrode CE. The common electrode CE may include a transparent conductive material. In one embodiment, the common electrode CE may include ITO and may be formed to a thickness of 500 Å.

The second liquid crystal alignment layer LCA2 may be disposed on the common electrode CE.

The liquid crystal layer LCL may include a plurality of liquid crystal molecules LC that are initially aligned. The liquid crystal molecules LC may have a negative dielectric anisotropy and may be vertically aligned in their initial alignment state. The liquid crystal molecules LC may have a predetermined pretilt angle in their initial alignment state. The initial alignment of the liquid crystal molecules LC may be induced by the first and second liquid crystal alignment layers LCA1 and LCA2. In response to an electric field generated between the pixel electrode which includes the first, second, and third subpixel electrodes SPE1, SPE2, and SPE3 and the common electrode CE, the liquid crystal molecules LC may be tilted or rotated to change the polarization state of light passing through the liquid crystal layer LCL.

Various examples of the color filter layers 110 will hereinafter be described with reference to FIGS. 12 through 15.

Figure 12:
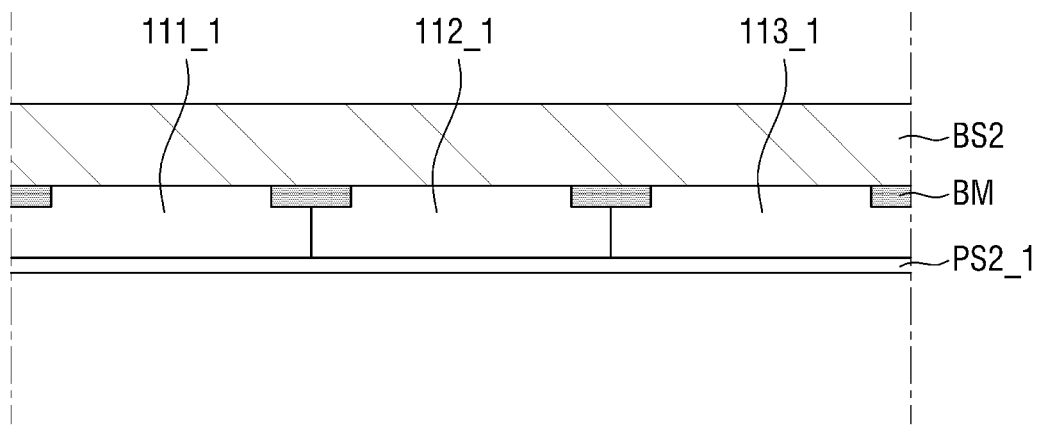
FIGS. 12, 13 and 14 are cross-sectional views of color filter layers according to embodiments of the present disclosure.
Figure 13:
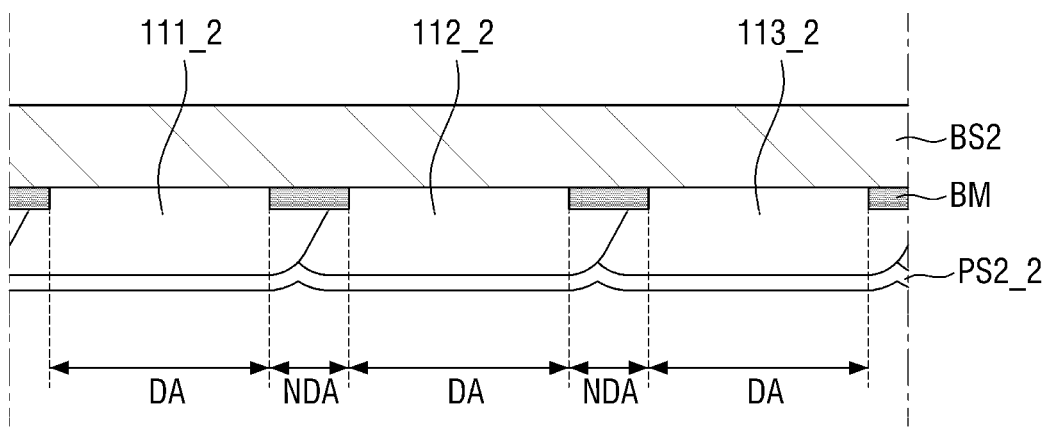
Figure 14:
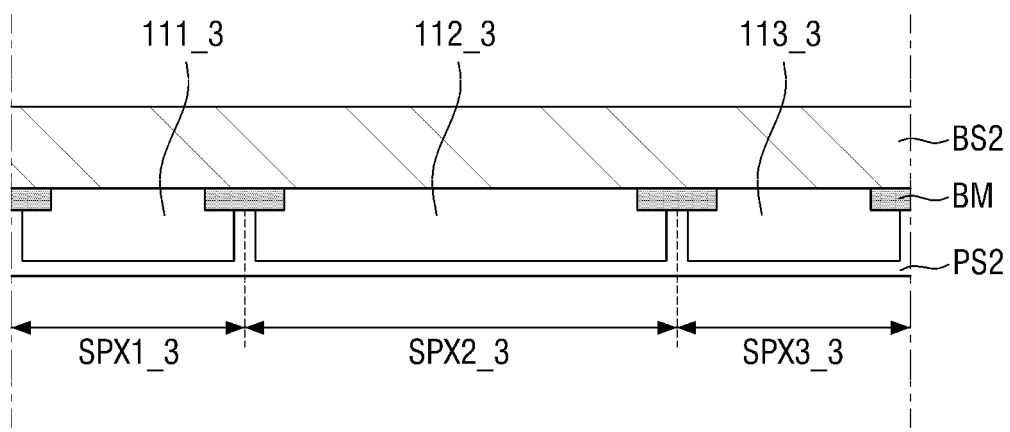

FIGS. 12 through 14 are cross-sectional views of color filter layers according to embodiments of the present disclosure. The embodiments of FIGS. 12 and 13 differ from the embodiment of FIG. 11 in that color filter layers 110 are not spaced apart from one another, and the embodiment of FIG. 14 differs from the embodiment of FIG. 11 in that color filter layers have different areas. The embodiments of FIGS. 12 through 14 will hereinafter be described, focusing mainly on the difference(s) with the embodiment of FIG. 11.

Referring to FIG. 12, color filter layers 110_1 may include first, second, and third color filter layers 111_1, 112_1, and 113_1. The first, second, and third color filter layers 111_1, 112_1, and 113_1 may be in contact with one another, instead of being spaced apart from one another. Regions where the first, second, and third color filter layers 111_1, 112_1, and 113_1 are in contact with one another may overlap with black matrices BM. A second passivation layer PS2_1 may be disposed on the first, second, and third color filter layers 111_1, 112_1, and 113_1 to be substantially parallel to a second substrate BS2. In a case where the first, second, and third color filter layers 111_1, 112_1, and 113_1 are in contact with one another, the second passivation layer PS2_1 may not be in contact with the black matrices BM.

In a case where the first, second, and third color filter layers 111_1, 112_1, and 113_1 are in contact with one another, instead of being spaced apart from one another, the first, second, and third color filter layers 111_1, 112_1, and 113_1 can generally maintain flatness. The second polarizing layer 150 of FIG. 11 may be formed by nanoimprinting. That is, in a case is where a surface where the second polarizing layer 150 of FIG. 11 is to be formed does not maintain flatness, the second polarizing layer 150 of FIG. 11 may be irregularly formed. Thus, if the first, second, and third color filter layers 111_1, 112_1, and 113_1 are in contact with one another, instead of being spaced apart from one another, and are thus able to maintain flatness, the second polarizing layer 150 can be uniformly formed and can thus effectively perform an optical shutter function.

Referring to FIG. 13, color filter layers 110_2 may include first, second, and third color filter layers 111_2, 112_2, and 113_2.

As already mentioned above, black matrices BM may block the transmission of light. That is, regions that vertically overlap with black matrices BM may be non-display areas NDA. Regions that vertically overlap with the color filter layers 110_2 but do not overlap with the black matrices BM may be display areas DA.

The first, second, and third color filter layers 111_2, 112_2, and 113_2 may at least partially overlap with one another in the non-display areas NDA. For example, the first and second color filter layers 111_2 and 112_2 may at least partially overlap with each other in the non-display areas NDA. Even if the first, second, and third color filter layers 111_2, 112_2, and 113_2 overlap with one another, the overlapping parts of the first, second, and third color filter layers 111_2, 112_2, and 113_2 are all disposed in the non-display areas NDA, and thus, color mixing can be prevented.

In a case where the first, second, and third color filter layers 111_2, 112_2, and 113_2 are disposed to be in contact with one another, instead of being spaced apart from one another, as illustrated in FIG. 12, height differences in the non-display areas NDA can be effectively prevented. However, in the embodiment of FIG. 13, even if height differences are generated due to the first, second, and third color filter layers 111_2, 112_2, and 113_2 partially overlapping with one another, the height differences can be sufficiently reduced.

A second passivation layer PS2_2 may be formed along the surfaces of the first, second, and third color filter layers 111_2, 112_2, and 113_2 to have a uniform thickness.

Referring to FIG. 14, color filter layers 110_3 may include first, second, and third color filter layers 111_3, 112_3, and 113_3.

In the embodiments of FIGS. 11 through 13, subpixels may have the same area, but in the embodiment of FIG. 14, first, second, and third subpixels SPX1_3, SPX2_3, and SPX3_3 may have different areas. For example, the second subpixel SPX2_3 may have a larger area than the first and third subpixels SPX1_3 and SPX3_3.

In a case where the first, second, and third subpixels SPX1_3, SPX2_3, and SPX3_3 have different areas, the color ratio of light transmitted through the first subpixel SPX1_3, the second subpixel SPX2_3 and the color filter layers 110_3 may differ from one another. For example, when light transmitted through the first subpixel SPX1_3 is red light, light transmitted through the second subpixel SPX2_3 is green light, light transmitted through the third subpixel SPX3_3 is blue light, and the second subpixel SPX2_3 has the largest area, the ratio of green light among beams of light transmitted through the color filter layers 110_3 in the maximum luminance state of the display device 1 may be highest.

In a case where a particular subpixel has a larger area than other subpixels, as illustrated in FIG. 14, the color of light transmitted through the particular subpixel can be emphasized. That is, the overall color tone of the display device 1 can be controlled.

Figure 15:
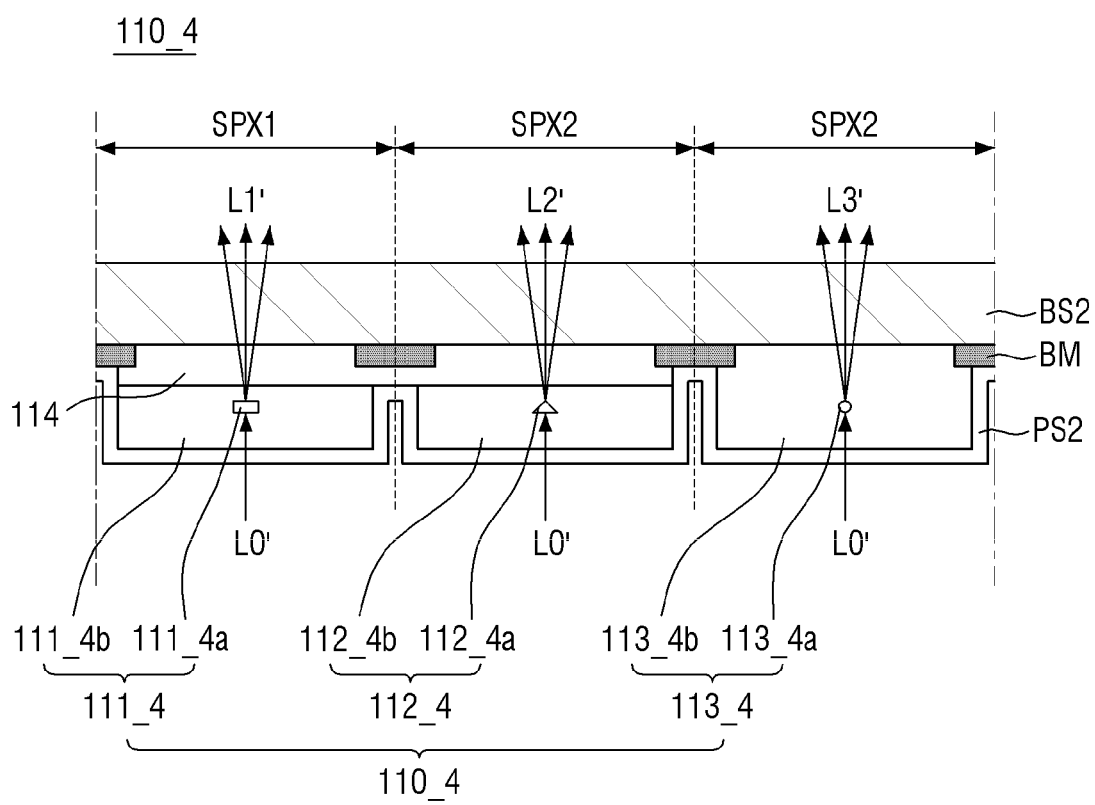
FIG. 15 is a cross-sectional view of a color filter layer according to another embodiment of the present disclosure.

FIG. 15 is a cross-sectional view of a color filter layer according to another embodiment of the present disclosure. The embodiment of FIG. 15 differs from the embodiment of FIG. 11 in that color filter layers 110_4 include a first wavelength conversion material 111_4a, a second wavelength conversion material 112_4a, or a light scattering material 113_4a. For convenience, the first wavelength conversion material 111_4a, the second wavelength conversion material 112_4a, and the light scattering material 113_4a are illustrated in FIG. 15 as being single particles. Also, for convenience, any changes in the path of light depending on the refractive indexes of media are not considered in the following description of FIG. 15.

Referring to FIG. 15, the color filter layers 110_4 may include a first filter 114, a first wavelength conversion pattern 111_4, a second wavelength conversion pattern 112_4, and a first light-transmitting pattern 113_4. Light L0' provided to the color filter layers 110_4 by the backlight unit 20 of FIG. 11 may be blue light, but the present disclosure is not limited thereto. Alternatively, the light L0' may be near ultraviolet light.

The first filter 114 may be disposed on a second substrate BS2 and black matrices BM. The first filter 114 may be disposed to overlap with first and second subpixels SPX1 and SPX2, but not with a third subpixel SPX3. The first filter 114 may be a cutoff filter transmitting light of a predetermined wavelength band therethrough and blocking light of another predetermined wavelength band. In one embodiment, the first filter 114 may be a blue cutoff filter transmitting red light and green light therethrough and blocking blue light.

In one embodiment, the first filter 114 may include an organic material having photosensitivity. In one embodiment, the thickness of the first filter 114 may be about 0.5 µm to about 2 µm or about 0.5 µm to about 1.5 µm. In a case where the thickness of the first filter 114 is 0.5 µm or greater, a sufficient absorption ability for light of a predetermined wavelength band can be imparted to the first filter 114. A height difference generated by the first filter 114 can be minimized when the thickness of the first filter 114 is equal to or less than 2 µm, and color mixing can be suppressed by minimizing the distance between the black matrices and first and second wavelength conversion patterns 111_4 and 112_4.

The first and second wavelength conversion patterns 111_4 and 112_4 may be disposed on the first filter 114. The first and second wavelength conversion patterns 111_4 and 112_4 may include a material capable of converting or shifting the wavelength band of light provided from the outside. Accordingly, the first and second wavelength conversion patterns 111_4 and 112_4 can convert the color of light incident thereupon into a different color so that the light can be emitted to the outside in the different color.

The first wavelength conversion pattern 111_4 may be disposed on the first filter 114 to overlap with the first subpixel SPX1. The second wavelength conversion pattern 112_4 may be disposed on the first filter 114 to overlap with the second subpixel SPX2.

The first wavelength conversion pattern 111_4 may receive the blue light L0' from the backlight unit 20 of FIG. 11, may convert or shift the central wavelength of the blue light L0', and may emit light L1' to the outside. The light L1' may be red light. The second wavelength conversion pattern 112_4 may receive the blue light L0' from the backlight unit 20 of FIG. 11, may convert or shift the central wavelength of the blue light L0', and may emit light L2' to the outside. The light L2' may be green light.

The blue light L0', which is provided by the backlight unit 20 of FIG. 11, may be light having a central wavelength of 430 nm to 470 nm, the red light L1' may be light having a central wavelength of 610 nm to 650 nm, and the green light L2' may be light having a central wavelength of 530 nm to 570 nm.

The first wavelength conversion pattern 111_4 may include the first wavelength conversion material 111_4a and a first light-transmitting resin 111_4b.

The first wavelength conversion material 111_4a may be a material converting the blue light L0' into the red light L1'. In one embodiment, the first wavelength conversion material 111_4a may include first quantum dots. The size of the first quantum dots is not particularly limited as long as the first wavelength conversion material 111_4a is capable of converting the blue light L0' into the red light L1'.

The first wavelength converting material 111_4a may be dispersed to be naturally distributed within the first light-transmitting resin 111_4b. The material of the first light-transmitting resin 111_4b is not particularly limited as long as the first light-transmitting resin 111_4b is a transparent medium that neither affects the wavelength conversion performance of the first wavelength converting material 111_4a nor causes light absorption. For example, the first light-transmitting resin 111_4b may include an organic material such as an epoxy resin or an acryl resin.

The second wavelength conversion pattern 112_4 may include the second wavelength conversion material 112_4a and a second light-transmitting resin 112_4b.

The second wavelength conversion material 112_4a may be a material converting the blue light L0' into the green light L2'. In one embodiment, the second wavelength conversion material 112_4a may include second quantum dots. The size of the second quantum dots is not particularly limited as long as the second wavelength conversion material 112_4a is capable of converting the blue light L0' into the green light L2'.

The second wavelength conversion material 112_4a may be dispersed to be naturally distributed within the second light-transmitting resin 112_4b. The material of the second light-transmitting resin 112_4b is not particularly limited as long as the second light-transmitting resin 112_4b is a transparent medium that neither affects the wavelength conversion performance of the second wavelength converting material 112_4a nor causes light absorption. For example, the second light-transmitting resin 112_4b may include an organic material such as an epoxy resin or an acryl resin.

The first quantum dots and the second quantum dots may have a core-shell structure. The cores of the first quantum dots and the second quantum dots may include a semiconductor nanocrystal material. In one embodiment, the cores of the first quantum dots and the second quantum dots may be selected from among a Group II-VI compound, a Group III-V compound, a Group IV-VI compound, a Group IV element, a Group IV compound, and a combination thereof. Examples of each of these compounds or elements have already been described above with reference to FIGS. 7 and 8, and thus, detailed descriptions thereof will be omitted.

In one embodiment, the first quantum dots and the second quantum dots may be spherical, pyramid, multi-arm, or cubic nanoparticles, nanotubes, nanowires, nanofibers, nanoplatelets.

In one embodiment, the first quantum dots and the second quantum dots may have an emission Full Width at Half Maximum (FWHM) of about 45 nm or less, preferably about 30 nm or less. In this case, color purity or color reproducibility can be improved. Also, since light can be emitted in all directions via the first quantum dots and the second quantum dots, the optical viewing angle of the display device 1 can be improved.

In one embodiment, the size (e.g., the particle size) of the first quantum dots may be greater than the size (e.g., the particle size) of the second quantum dots. For example, the first quantum dots may have a size of about 55 Å to 65 Å, and the second quantum dots may have a size of about 40 521 to 50 Å. Light is emitted in various directions by the first quantum dots and the second quantum dots regardless of the incidence angle thereof.

The red light L1' emitted by the first wavelength conversion pattern 111_4 and the green light L2' emitted by the second wavelength conversion pattern 112_4 may be in unpolarized light. The term "unpolarized light", as used herein, refers to light that is random polarized. Examples of unpolarized light include natural light.

The first light-transmitting pattern 113_4 may be disposed on the second substrate BS2 and the black matrices BM. The first light-transmitting pattern 113_4 may be disposed to overlap with the third subpixel SPX3 on which the first filter 114 is not disposed. The first light-transmitting pattern 113_4 may transmit incident light therethrough without converting the color of the incident light. That is, the first light-transmitting pattern 113_4 may receive the blue light L0' from the backlight unit 20 of FIG. 11 and may transmit the blue light L0' therethrough without converting or shifting the central wavelength of the blue light L0'. In other words, the color of light incident upon the first light-transmitting pattern 113_4, i.e., the blue light L0', may be the same as the color of light emitted from the first light-transmitting pattern 113_4, i.e., light L3'.

The first light-transmitting pattern 113_4 may include the light scattering material 113_4a and a third light-transmitting resin 113_4b. The light scattering material 113_4a may be dispersed in the third light-transmitting resin 113_4b to scatter light provided to the first light-transmitting pattern 113_4 and thus to emit the light to the outside. The first light-transmitting pattern 113_4 may scatter the blue light L0', which is provided by the backlight unit 20, and may thus emit the light L3' to the outside.

The light scattering material 113_4a may scatter and emit incident light in various directions regardless of the incidence angle of the incident light. Here, the light L3' may be in an unpolarized light. That is, the light scattering material 113_4a may scatter the blue light L0', which is provided by the backlight unit 20, in various directions regardless of the incidence angle of the blue light L0', while not converting the central wavelength of the blue light L0'.

In one embodiment, the light scattering material 113_4a may have a different refractive index from the third light-transmitting resin 113_4b. The light scattering material 113_4a is not particularly limited as long as it is capable of scattering incident light. For example, the light scattering material 113_4a may be a metal oxide or an organic material. Examples of the metal oxide include titanium oxide ($TiO_2$), zirconium oxide ($ZrO_2$), aluminum oxide ($Al_2O_3$), indium oxide ($In_2O_3$), zinc oxide (ZnO), and tin oxide ($SnO_2$). Examples of the organic material include an acrylic resin and a urethane resin.

In one embodiment, the third light-transmitting resin 113_4b may be a transparent light-transmitting resin. The third light-transmitting resin 113_4b may be formed of the same material as, or a different material from, the first and second light-transmitting resins 111_4b and 112_4b.

The light scattering effect of the light scattering layer 120 will hereinafter be described with reference to FIGS. 16 and 17.

Figure 16:
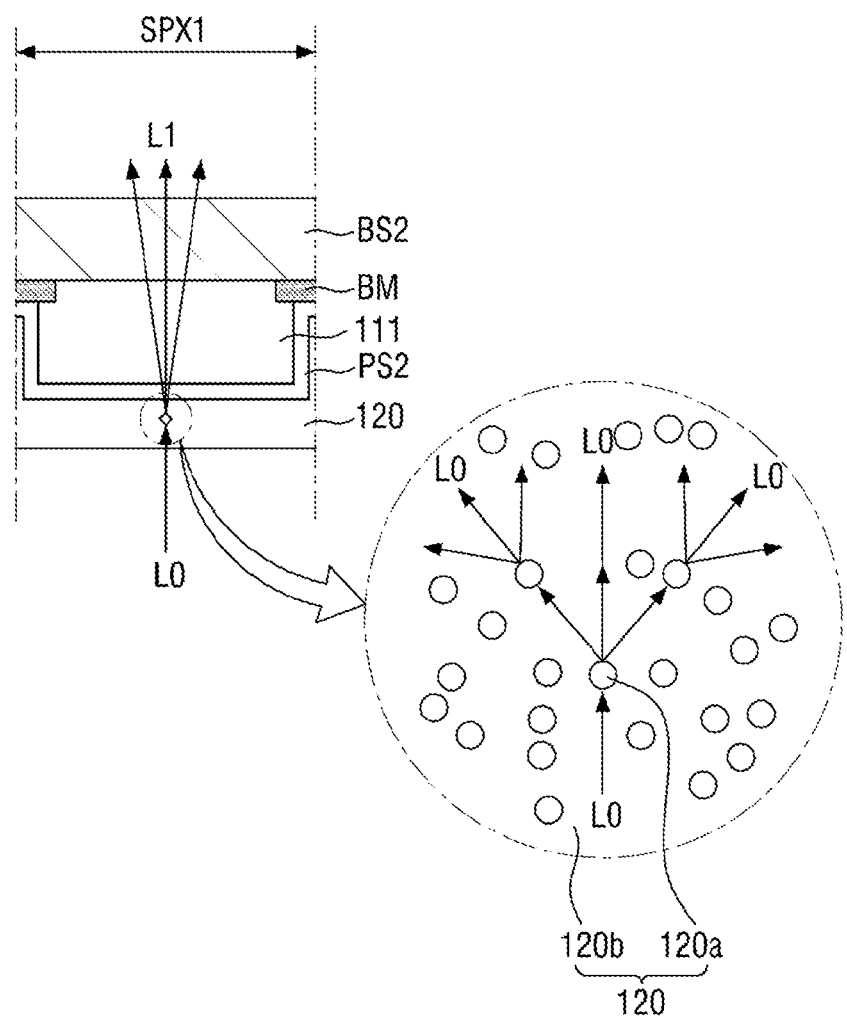
FIG. 16 is a cross-sectional view and a partial enlarged view of a scattering layer according to an embodiment of the present disclosure.

FIG. 16 is a cross-sectional view and a partial enlarged view of a scattering layer according to an embodiment of the present disclosure. Specifically, FIG. 16 is a cross-sectional view illustrating a first color filter layer 111 and a light scattering layer 120 in a region that overlaps with a first subpixel SPX1.

Referring to FIG. 16, the light scattering layer 120 may include a base layer 120b and light scatterers 120a dispersed in the base layer 120b. The material of the base layer 120b is not particularly limited as long as the base layer 120b has high light transmittance and has excellent dispersing characteristics for the light scatterers 120a. For example, the base layer 120b may include an organic material such as an acrylic resin, an epoxy resin, a cardo resin, or an imide resin.

The light scatterers 120a may have a different refractive index from the base layer 120b and may form an optical interface with the base layer 120b. The material of the light scatterers 120a is not particularly limited as long as the light scatterers 120a are capable of scattering at least some light passing through the light scattering layer 120. For example, the light scatterers 120a may include a metal oxide. Examples of the metal oxide include titanium oxide, zirconium oxide, aluminum oxide, indium oxide, zinc oxide, and tin oxide. The light scatterers 120a will hereinafter be described as including titanium oxide. The light scatterers 120a can scatter incident light L0 in various directions regardless of the incidence angle of the incident light L0, while substantially not converting the wavelength of light passing through the light scattering layer 120.

The incident light L0, which is incident upon the light scattering layer 120, may be light provided by the backlight unit 20 of FIG. 11 or may be white light. The incident light L0 may be scattered in various directions in accordance with the difference in refractive index at the optical interfaces between the light scatterers 120a and the base layer 120b. The scattered light may be incident into the first color filter layer 111, and red light L1 passing through the first color filter layer 111 may be emitted in various directions. Accordingly, the side visibility of the red light L1 displayed by the first subpixel SPX1 can be improved. In a case where the light scattering layer 120 including the light scatterers 120a is disposed, side visibility can be improved, and the degree to which side visibility is improved may vary depending on the concentration of light scatterers 120a.

Figure 17:
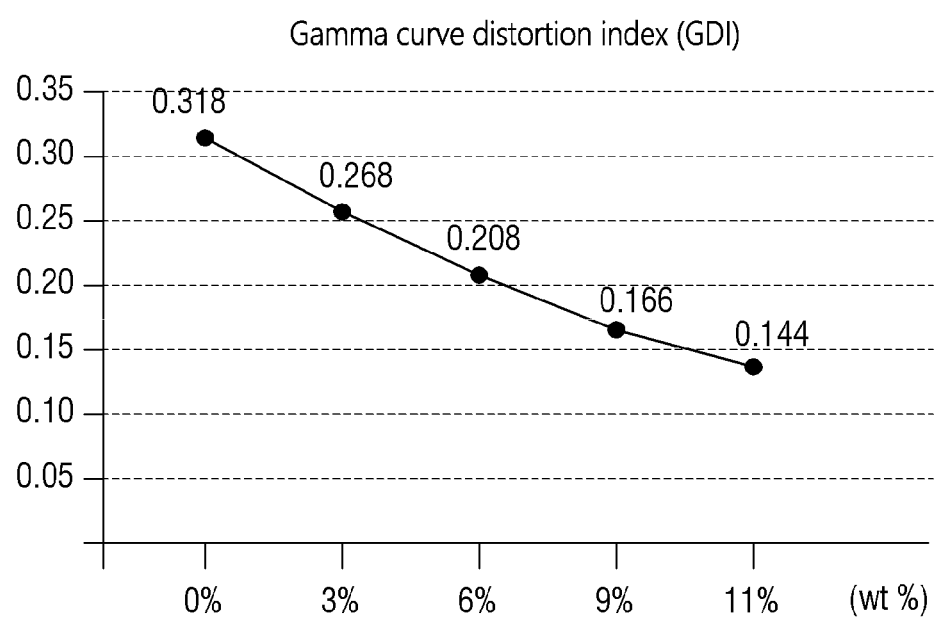
FIG. 17 is a graph for explaining the improvement of side visibility in accordance with the concentration of light scatterers in the scattering layer of FIG. 16.

FIG. 17 is a graph for explaining the improvement of side visibility in accordance with the concentration of light scatterers in the scattering layer of FIG. 16.

Referring to FIG. 17, the horizontal axis represents the concentration of light scatterers included in a light scattering layer. The concentration of light scatterers may be represented as the percentage ratio of the mass of the light scatterers to the mass of a base layer including the light scatterers. The vertical axis represents a gamma curve distortion index (GDI), which is a side visibility index, according to the concentration of light scatterers. The GDI is a numerical value representing side visibility. The smaller the GDI, the smaller the degree of image distortion as viewed from a side, i.e., the better the side visibility.

Referring to the graph of FIG. 17, when the concentration of light scatterers is 0%, i.e., when no light scatterers are included, the GDI is 0.318. If the GDI is greater than 0.3, the side visibility of a display device may be so poor that it may be difficult to use the display device.

When the concentration of light scatterers is 3%, the GDI is 0.268. That is, when the light scatterers are included, the side visibility of the display device can be improved.

When the concentration of light scatterers is 6%, 9%, and 11%, the GDI is 0.208, 0.166, and 0.144, respectively. That is, the greater the concentration of light scatterers is, the better the side visibility of the display device is.

If too many light scatterers are included in the light scattering layer, the front luminance and the contrast ratio of the display device may deteriorate. That is, the side visibility of the display device may be in a tradeoff relationship with the front luminance and the contrast ratio of the display device. Thus, by controlling the concentration of light scatterers in the light scattering layer, a display device having desired characteristics can be obtained. In one embodiment, the concentration of light scatterers may preferably be 6%. In this case, a display device having both an excellent side visibility and an excellent front luminance can be obtained.

Various exemplary light scattering layers 120 will hereinafter be described with reference to FIGS. 18 through 20.

Figure 18:
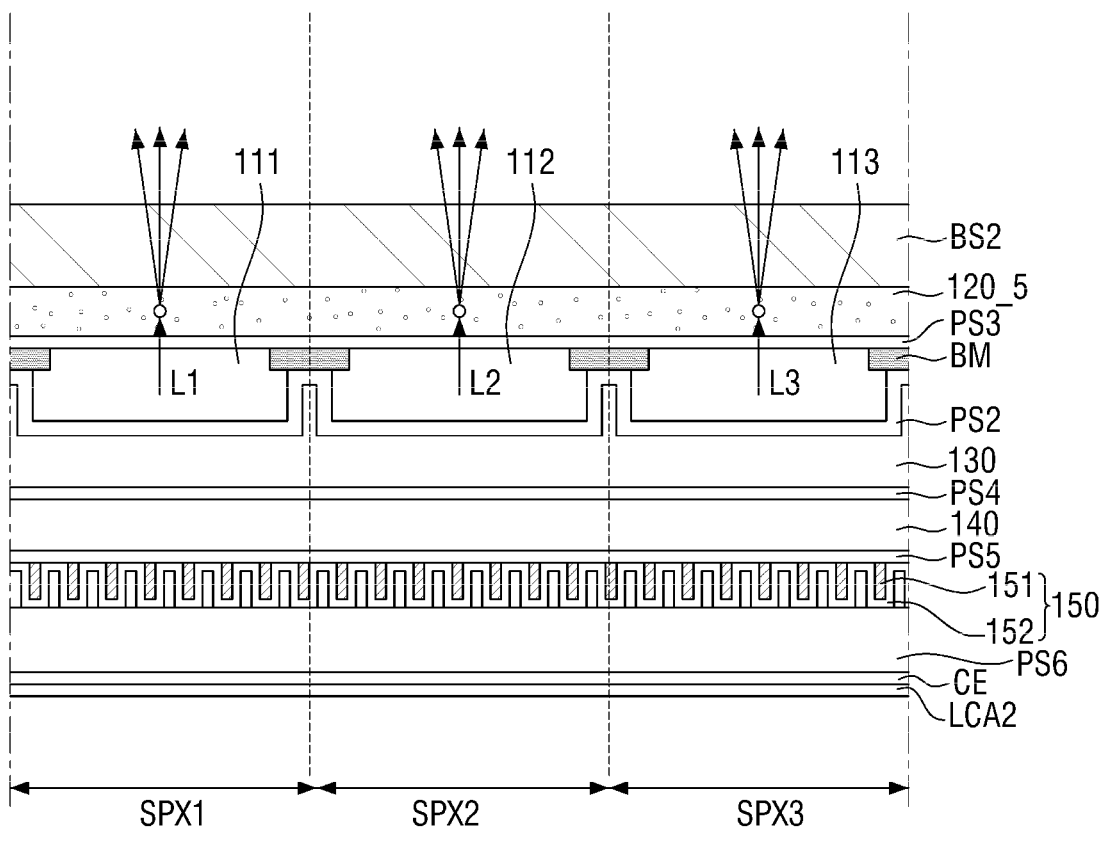
FIGS. 18, 19 and 20 are cross-sectional views of upper display panels according to embodiments of the present disclosure.
Figure 19:
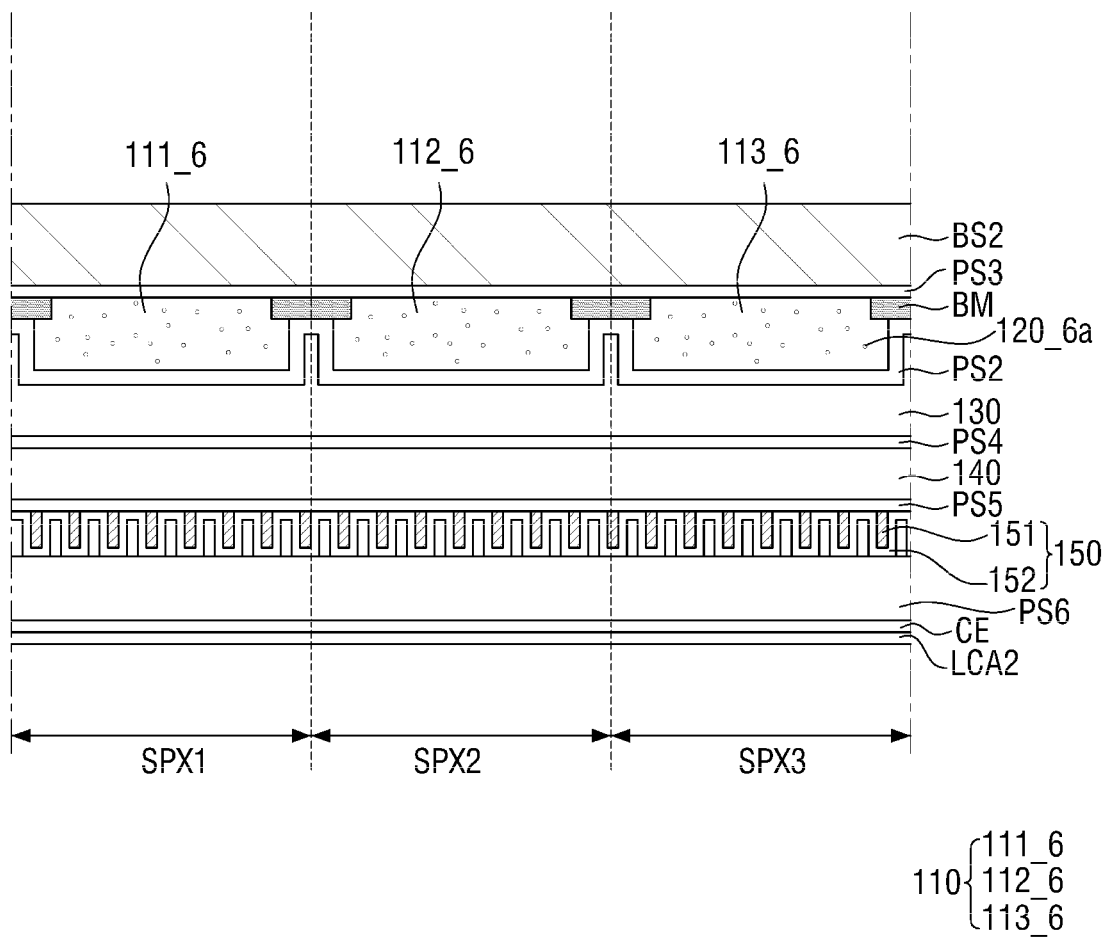
Figure 20:
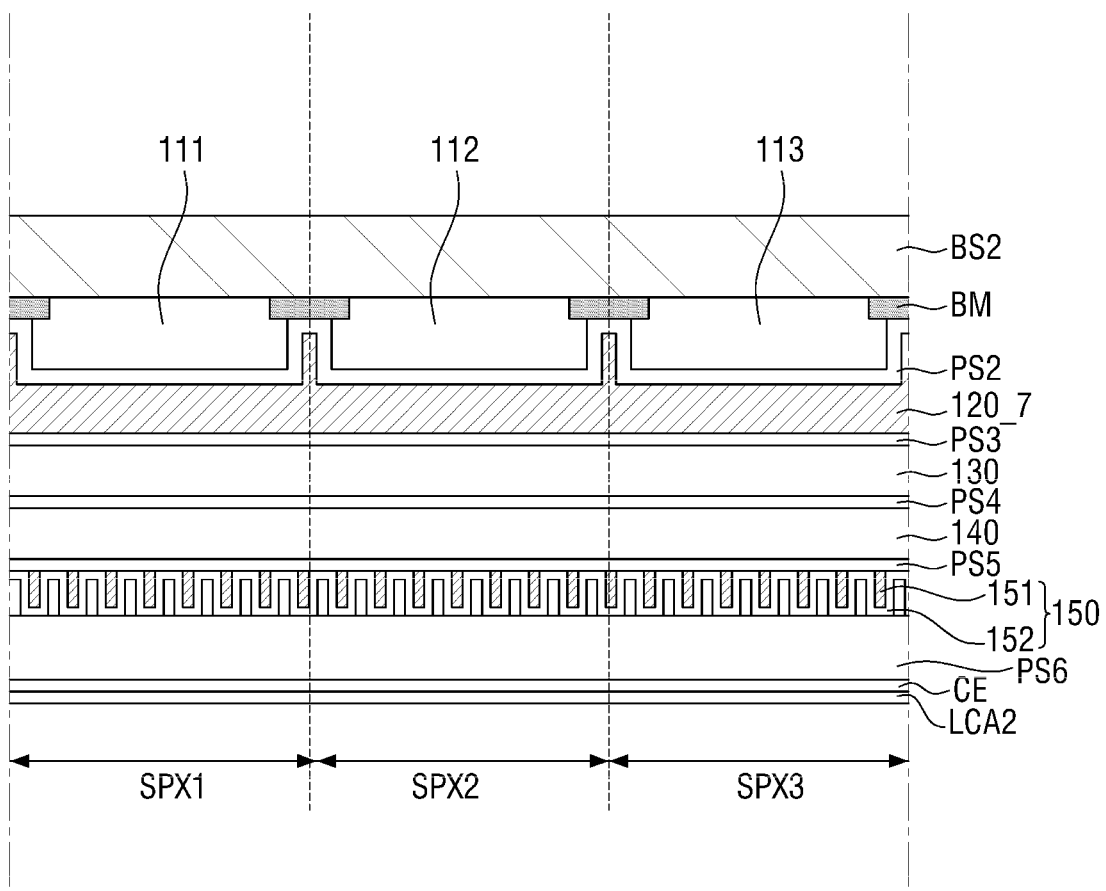

FIGS. 18 through 20 are cross-sectional views of upper display panels according to embodiments of the present disclosure. The embodiment of FIG. 18 differs from the embodiment of FIG. 11 in that a light scattering layer is disposed between a second substrate and color filter layers, the embodiment of FIG. 19 differs from the embodiment of FIG. 11 in that no separate light scattering layer is provided and color filter layers include light scatterers, and the embodiment of FIG. 20 differs from the embodiment of FIG. 11 in that a light scattering layer includes a low refraction organic film. The embodiments of FIGS. 18 through 20 will hereinafter be described focusing mainly on the differences with the embodiment of FIG. 11.

Referring to FIG. 18, an upper display panel SUB2_5 may include a second substrate BS2, a light scattering layer 120_5 disposed on the second substrate BS2, and black matrices BM and color filter layers 110 disposed on the light scattering layer 120_5.

The light scattering layer 120_5 may be disposed between the second substrate BS2 and the color filter layers 110. The light scattering layer 120_5 may be disposed in parallel to the second substrate BS2. The thickness of the light scattering layer 120_5 may be 1 μm to 3 μm. In one embodiment, the thickness of the light scattering layer 120_5 may be 2 μm.

Light (L1, L2, and L3) transmitted through the color filter layers 110 may be incident upon the light scattering layer 120_5. That is, red light L1 transmitted through a first color filter layer 111 can be scattered and emitted in various directions by the light scattering layer 120_5. Green light L2 transmitted through a second color filter layer 112 and blue light L3 transmitted through a third color filter layer 113 can also be scattered and emitted in various directions by the light scattering layer 120_5. Accordingly, the side viewing angle of the display device 1 can be improved.

In a case where the light scattering layer 120_5 is disposed between the second substrate BS2 and the color filter layers 110, as illustrated in FIG. 18, color mixing may occur due to the light scattering layer 120_5. For example, when the green light L2 transmitted through the second color filter layer 112 is scattered by the light scattering layer 120_5, the scattered light may be emitted through a first subpixel SPX1 and/or a third subpixel SPX3. Although not specifically illustrated, in a case where the black matrices BM are disposed between the second substrate BS2 and the light scattering layer 120_5, color mixing can be effectively prevented.

Referring to FIG. 19, an upper display panel SUB2_6 may include a second substrate BS2 and color filter layers 110_6 disposed on the second substrate BS2. That is, the upper display panel SUB2_6, unlike the upper display panel SUB2 of FIG. 11, does not include a light scattering layer and may include light scatterers 120_6a, which are disposed in the color filter layers 110_6.

The color of light incident into the color filter layers 110_6 may be changed by colorants or dyes included in the color filter layers 110_6 and the light may be scattered by the light scatterers 120_6a.

As already mentioned above, the material of the light scatterers 120_6a is not particularly limited as long as the light scatterers 120_6a are capable of scattering at least some light passing through the color filter layers 110_6. For example, the light scatterers 120_6a may be formed of titanium oxide, zirconium oxide, aluminum oxide, indium oxide, or zinc oxide. In one embodiment, the light scatterers 120_6a may be formed of titanium oxide. The light scatterers 120_6a may be mixed with the colorants or dyes included in the color filter layers 110_6 in the process of mixing the colorants or dyes included in the color filter layers 110_6. As already discussed above with reference to the graph of FIG. 17, the light scatterers 120_6a may be included at a concentration of 3% to 11% of the total weight of the color filter layers 110_6.

In a case where a light scattering layer is not included in the upper display panel SUB2_6, the thickness of the display device 1 can be generally reduced, the path of light emitted from the backlight unit 20 can be shortened, and the luminance of the display device 1 can be improved.

Referring to FIG. 20, an upper display panel SUB2_7 may include a second substrate BS2, color filter layers 110 disposed on the second substrate BS2, and a light scattering layer 120_7 disposed on the color filter layers 110.

The light scattering layer 120_7 may not include separate light scatterers. The light scattering layer 120_7 may be formed as a low refraction organic film and may thus scatter incident light. The low refraction organic film may include a resin and pores formed in the resin.

Light incident into the light scattering layer 120_7 may be reflected by multiple optical interfaces formed by the pores of the light scattering layer 120_7. That is, the light incident into the light scattering layer 120_7 may be scattered in various directions by the multiple optical interfaces.

In one embodiment, the light scattering layer 120_7 may include an organic material such as an acrylic resin, an epoxy resin, a cardo resin, or an imide resin and one of hollow silica, nano-silicate, and porogen dispersed in the organic material. In another embodiment, the light scattering layer 120_7 may be formed of the same material as the low refraction layer 24 described above with reference to FIG. 10A or 10B.

Figure 21:
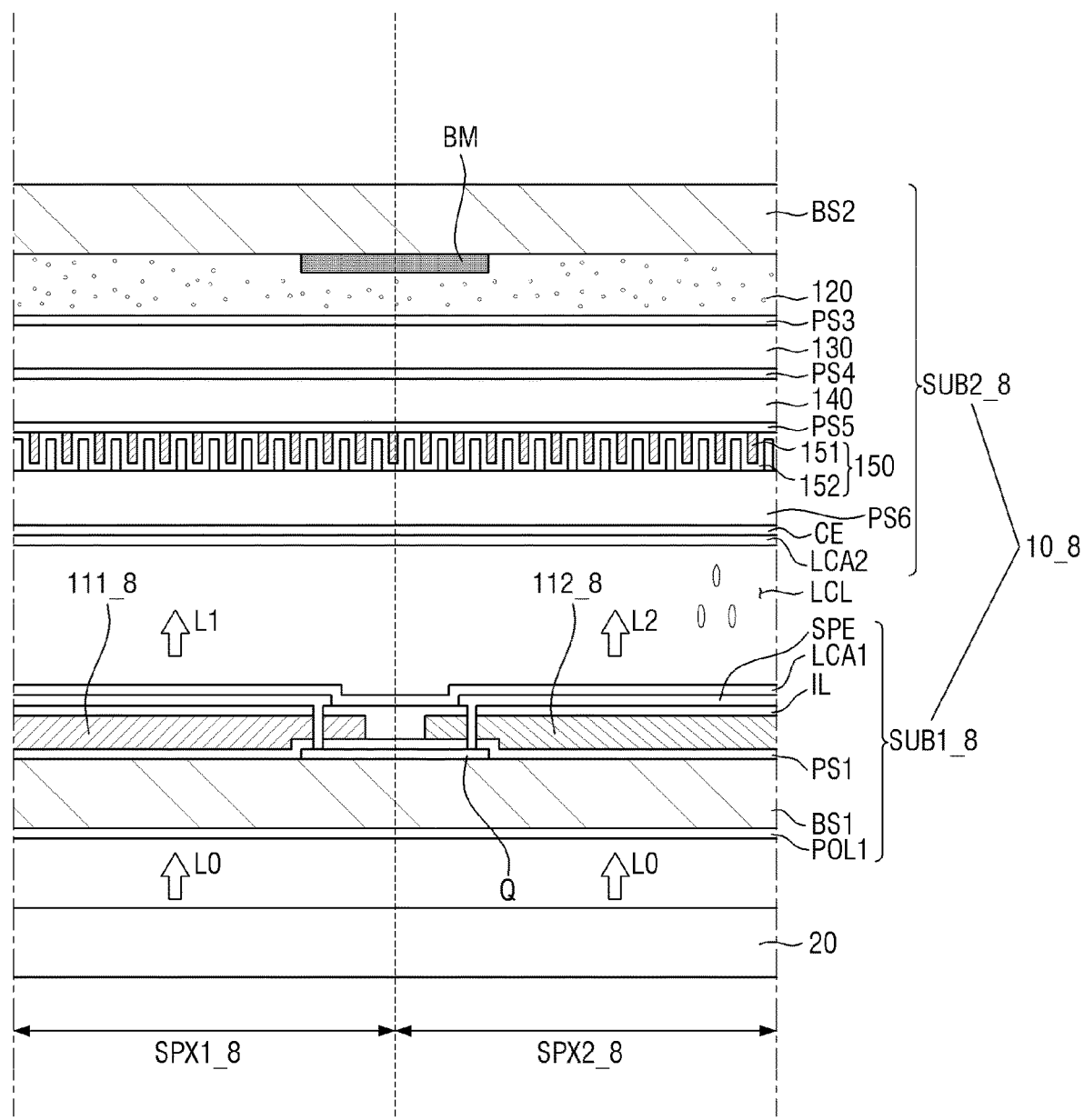
FIG. 21 is a cross-sectional view of a display device according to another embodiment of the present disclosure.

FIG. 21 is a cross-sectional view of a display device according to another embodiment of the present disclosure. The embodiment of FIG. 21 differs from the embodiment of FIG. 11 in that a color filter layer is disposed on a lower display panel. The embodiment of FIG. 21 will hereinafter be described, focusing mainly on the difference with the embodiment of FIG. 11.

Referring to FIG. 21, a display device 1_8 may include a display panel 10_8 and a backlight unit 20. The display panel 10_8 may include a lower display panel SUB1_8, an upper display panel SUB2_8 disposed to face the lower display panel SUB1_8, and a liquid crystal layer LCL disposed between the lower and upper display panels SUB1_8 and SUB2_8. The liquid crystal layer LCL may be in the state of being sealed by the lower and upper display panels SUB1_8 and SUB2_8 and a sealing member (not illustrated) bonding the lower and upper display panels SUB1_8 and SUB2_8 together.

The lower display panel SUB1_8 may include a first substrate BS1, a switching element Q disposed on the first substrate BS', a first passivation layer PS1 disposed on the switching element Q, color filter layers 110_8 disposed on the first passivation layer PS1, an intermediate layer IL disposed on the color filter layers 110_8, a subpixel electrode SPE disposed on the intermediate layer IL and connected to the switching element Q, and a first liquid crystal alignment layer LCA1 disposed on the subpixel electrodes SPE.

The upper display panel SUB2_8 may include a second substrate BS2, black matrices BM disposed on the second substrate BS2, a light scattering layer 120 disposed on the black matrices BM, a planarization organic layer 130 disposed on the light scattering layer 120, a planarization resin layer 140 disposed on the planarization organic layer 130, a second polarizing layer 150 disposed on the planarization resin layer 140, a common electrode CE disposed on the second polarizing layer 150, and a second liquid crystal alignment layer LCA2 disposed on the common electrode CE.

The lower display panel SUB1_8 may include the color filter layers 110_8, and the color filter layers 110_8 may be disposed between the switching element Q and the intermediate layer IL of the lower display panel SUB1_8. That is, the lower display panel SUB1_8 may have a color filter-on-array (COA) structure. In the COA structure where the color filter layers 110_8 are disposed on the first substrate BS1, the aperture ratio of the display device 1_8 can be enhanced, and as a result, the luminance gain of the display device 1_8 can be improved.

The black matrices BM are illustrated as being disposed between the second substrate BS2 and the light scattering layer 120 of the upper display panel SUB1_8. Alternatively, the black matrices BM may be disposed between a first polarizing layer POL1 and the second polarizing layer 150.

In the above description, the present inventive concept has been described based on the exemplary embodiments, but the exemplary embodiments are for illustrative, and do not limit the present inventive concept, and those skilled in the art will appreciate that various modifications and applications, which are not exemplified in the above description, may be made without departing from the scope of the essential characteristic of the present exemplary embodiments. For example, each component described in detail in the exemplary embodiment can be modified and executed. Therefore, it should be construed that contents associated with the combination and modification are included in the scope of the present inventive concept.

What is claimed is:

1. A display device comprising:
   a first substrate;
   a second substrate facing the first substrate;
   a first polarizing layer disposed between the first substrate and the second substrate and including first line grid patterns;
   a light scattering layer disposed between the first polarizing layer and the second substrate;
   color filter layers disposed between the light scattering layer and the second substrate;
   a light blocking layer disposed between the color filter layers; and
   a planarization organic layer disposed between the light scattering layer and the first polarizing layer to cover the color filter layers and the light blocking layer.

2. The display device of claim 1, wherein the light scattering layer includes a base layer which includes an organic material and light scatterers which are dispersed in the base layer.

3. The display device of claim 2, wherein the light scatterers include $TiO_2$ or $SiO_2$ and have 3 to 11 parts by weight per 100 parts by weight of the light scattering layer.

4. The display device of claim 3, wherein a thickness of the light scattering layer is 1 μm to 6 μm.

5. The display device of claim 2, wherein each pair of adjacent color filter layers are spaced apart from each other to form a gap therebetween.

6. The display device of claim 5, wherein the light blocking layer is disposed to overlap with the gap formed between the each pair of adjacent color filter layers.

7. The display device of claim 6, wherein the light scattering layer fills the gap formed between the each pair of adjacent color filter layers.

8. The display device of claim 2, wherein each pair of adjacent color filter layers are in contact with each other.

9. The display device of claim 8, further comprising:
   a first passivation layer disposed between the color filter layers and the light scattering layer,
   wherein a first surface of the first passivation layer is in contact with the color filter layers and a second surface of the first passivation layer is in contact with the light scattering layer.

10. The display device of claim 2, wherein the color filter layers include red, green, and blue color filter layers.

11. The display device of claim 2, wherein the color filter layers include a wavelength conversion material.

12. The display device of claim 11, further comprising:
   a first passivation layer disposed on a surface of the planarization organic layer.

13. The display device of claim 12, further comprising:
   a planarization resin layer disposed between the planarization organic layer and the first polarizing layer,
   wherein the planarization organic layer is thicker than the planarization resin layer, and
   wherein the first passivation layer is disposed between the planarization organic layer and the planarization resin layer.

14. The display device of claim 1, wherein the first line grid patterns include at least one of aluminum (Al), silver (Ag), gold (Au), copper (Cu), titanium (Ti), molybdenum (Mo), nickel (Ni), and an alloy thereof.

15. The display device of claim 14, wherein the first polarizing layer includes a low reflection metal layer which is disposed on the first line grid patterns.

16. The display device of claim 15, wherein the low reflection metal layer includes $MoTaOx$ and has a thickness of 200 Å to 400 Å.

17. The display device of claim 1, further comprising:
   a liquid crystal layer disposed between the first and second substrates, wherein the first polarizing layer is disposed between the liquid crystal layer and the second substrate.

18. The display device of claim 17, further comprising:
a second polarizing layer,
wherein the liquid crystal layer is disposed between the first and second polarizing layers.

19. The display device of claim 18, wherein the second polarizing layer is disposed between the first substrate and the liquid crystal layer and includes second line grid patterns.

20. The display device of claim 18, further comprising:
a backlight unit disposed below the first substrate,
wherein the second substrate is disposed above the first substrate.

21. The display device of claim 20, wherein the backlight unit includes a light guide plate and a low refraction layer is disposed on and in contact with the light guide plate.

22. The display device of claim 21, wherein the light scattering layer includes the same material as the low refraction layer.

23. A display device comprising:
a first substrate;
a second substrate facing the first substrate;
a first polarizing layer disposed between the first substrate and the second substrate and including first line grid patterns;
a light scattering layer disposed between the first polarizing layer and the second substrate; and
color filter layers disposed between the light scattering layer and the first polarizing layer,
wherein the first polarizing layer includes a low reflection metal layer which covers a top surface and side surfaces of the first line grid patterns.

24. The display device of claim 23, further comprising:
a liquid crystal layer disposed between the first and second substrates,
wherein the first polarizing layer is disposed between the liquid crystal layer and the second substrate, the display device further comprises a second polarizing layer, and the liquid crystal layer is disposed between the first and second polarizing layers.

25. The display device of claim 24, wherein the light scattering layer includes a base layer which includes an organic material and light scatterers which are dispersed in the base layer, and the light scatterers include $TiO_2$ or $SiO_2$ and have 3 to 11 parts by weight per 100 parts by weight of the light scattering layer.

26. The display device of claim 25, wherein the first line grid patterns include at least one of aluminum (Al), silver (Ag), gold (Au), copper (Cu), titanium (Ti), molybdenum (Mo), nickel (Ni), and an alloy thereof.

27. A display device comprising:
a first substrate;
a second substrate facing the first substrate;
a first polarizing layer disposed between the first substrate and the second substrate and including first line grid patterns;
color filter layers including light scatters, the color filter layers being disposed between the first polarizing layer and the second substrate;
a light blocking layer disposed between the color filter layers;
a planarization organic layer disposed between the color filter layers and the first polarizing layer to cover the color filter layers and the light blocking layer;
a planarization resin layer disposed between the planarization organic layer and the first polarizing layer, the planarization resin layer entirely covering the color filter layers and the light blocking layer; and
a passivation layer disposed between the planarization organic layer and the planarization resin layer.

28. The display device of claim 27, wherein the light scatters include $TiO_2$ or $SiO_2$ and have 3 to 11 parts by weight per 100 parts by weight of the color filter layers.

29. The display device of claim 28, wherein the first line grid patterns include at least one of aluminum (Al), silver (Ag), gold (Au), copper (Cu), titanium (Ti), molybdenum (Mo), nickel (Ni), and an alloy thereof, and the first polarizing layer includes a low reflection metal layer, which is disposed on the first line grid patterns.

* * * * *